United States Patent [19]
Goldburg

[11] Patent Number: 6,154,661
[45] Date of Patent: Nov. 28, 2000

[54] TRANSMITTING ON THE DOWNLINK USING ONE OR MORE WEIGHT VECTORS DETERMINED TO ACHIEVE A DESIRED RADIATION PATTERN

[75] Inventor: Marc H. Goldburg, Redwood City, Calif.

[73] Assignee: ArrayComm, Inc., San Jose, Calif.

[21] Appl. No.: 08/988,519

[22] Filed: Dec. 10, 1997

[51] Int. Cl.[7] .................................................. H04Q 7/30
[52] U.S. Cl. ........................ 455/562; 455/517; 370/277
[58] Field of Search .................................. 455/422, 522, 455/63, 560, 562, 525, 517; 370/277, 310, 334

[56] References Cited

U.S. PATENT DOCUMENTS

| | | | |
|---|---|---|---|
| 4,827,395 | 5/1989 | Anders et al. | 364/138 |
| 5,532,706 | 7/1996 | Reinhardt et al. | 343/778 |
| 5,548,813 | 8/1996 | Charas et al. | 455/33.3 |
| 5,603,089 | 2/1997 | Searle et al. | 455/53.1 |
| 5,615,409 | 3/1997 | Forssén et al. | 455/33.1 |
| 5,649,287 | 7/1997 | Forssén et al. | 370/312 |
| 5,745,858 | 4/1998 | Sato et al. | 455/562 |

*Primary Examiner*—Edward F. Urban
*Attorney, Agent, or Firm*—Townsend and Townsend and Crew LLP; Henry K. Woodward; Dov Rosenfeld

[57] ABSTRACT

This invention relates to a method and apparatus for transmitting one or more downlink signals simultaneously over the same conventional channel from a communication station to one or more subscriber units to achieve a desired overall radiation pattern (e.g., a near omnidirectional pattern) over a desired sector, the communication station including an array of antenna elements, determining means for determining weight vectors designed for the transmitting through the array to achieve the desired overall radiation pattern over the desired sector, one or more signal processors for weighting the downlink signals in phase and amplitude according to the weight vectors and adding the weighted signals to form a set of weighted downlink antenna signals, each summed and weighted downlink antenna signal having an intended antenna element in the array, a set of associated transmit apparatuses for transmitting the set of weighted downlink antenna signals using the array, each associated transmit apparatus including an input for receiving one of the summed and weighted downlink antenna signals, each antenna element coupled to the output of one of the associated transmit apparatuses.

49 Claims, 4 Drawing Sheets

TRANSMITTING ON THE DOWNLINK USING ONE OR MORE WEIGHT VECTORS DETERMINED TO ACHIEVE A DESIRED RADIATION PATTERN

FIELD OF INVENTION

This invention relates to the field of wireless communication systems, and more specifically, to the efficient broadcast of common downlink communication channel signals in a wireless communications system by a communication station that uses a multiple element transmitting antenna array in order to achieve a near omnidirectional pattern throughout its area of coverage.

BACKGROUND TO THE INVENTION

Cellular wireless communications systems are known, wherein a geographical area is divided into cells, and each cell includes a base station (BS, BTS) for communicating with subscriber units (SUs) (also called remote terminals, mobile units, mobile stations, subscriber stations, or remote users) within the cell. In such a system, there is a need for broadcasting information from a base station to subscriber units within the cell, for example to page a particular subscriber unit in order to initiate a call to that SU, or to send control information to all subscriber units on how to communicate with the base station, the control information including, for example, base station identification, timing, and synchronization data. Such paging and control information is broadcast on what are called common control channels. Because often there is no prior information regarding the location of the remote user(s) that need to receive the paging or control information, or because such information is intended for several users, it is preferable to transmit such signals omnidirectionally, or near omnidirectionally, where omnidirectional in general means that the radiated power pattern of the base station is independent of azimuth and elevation within the prescribed coverage area of the base station. In addition, some standard communication protocols require that certain channels be transmitted omnidirectionally, even when there is knowledge of the location of some of the intended recipient(s). Thus, even if there is a need to transmit the information on such a frequency channel directionally to particular users, the RF energy still needs to be transmitted omnidirectionally. This invention deals with methods and apparatuses for achieving such omnidirectional transmissions.

Some examples of a cellular system to which the present invention can be applied are systems using variants of the Personal Handy Phone System (PHS) protocol defined by the Association of Radio Industries and Businesses (ARIB) Preliminary Standard, RCR STD-28 (Version 2) December 1995, and systems that use the Global System for Mobile communications (GSM) protocol, including the original version, 1.8 GHz version called DCS-1800, and the North American 1.9 GHz personal communications system (PCS) version called PCS-1900, these three called "variants" of GSM herein. The PHS and GSM standards define two general sets of functional channels (also called logical channels): a control channel (CCH) set and a traffic channel (TCH) set. The TCH set includes bidirectional channels for transmitting user data between the subscriber units and a base station. The CCH set includes a broadcast control channel (BCCH), a paging channel (PCH), and several other control channels not of concern herein. The BCCH is a unidirectional downlink channel for broadcasting control information from the base station to the subscriber units that includes system and channel structure information, and the PCH is a one-way downlink channel that broadcasts information from the base station to a selected set of subscriber units, or to a wide area of multiple subscriber units (the paging area), and typically is used to alert a particular remote station of an incoming call. The present invention is applicable to all downlink broadcasts and transmissions. It is especially applicable for BCCH and PCH that are used by a base station to simultaneously transmit common information to more than one subscriber (i.e., to broadcast). It is also applicable to other situations where it is desired to transmit RF energy omnidirectionally.

The use of antenna arrays for the radiation of radio frequency (RF) energy is well established in a variety of radio disciplines. For the purposes of transmitting in the downlink from a base station which includes an antenna array to a remote receiver (the subscriber unit), the signal intended for the SU can be provided as input to each of the radiating elements of the array, differing from element to element only by gain and phase factors, usually resulting, by design, in a directional radiation pattern focused at the subscriber unit. The benefits of this sort of transmission strategy include increased gain over that possible using a single radiating element and reduced interference to other co-channel users in the system as compared to transmission by means of a single radiating element. Using such an antenna array, spatial division multiple access (SDMA) techniques also are possible in which the same "conventional channel" (i.e., the same frequency channel in a frequency division multiple access (FDMA) system, timeslot in a time division multiple access (TDMA) system, code in a code division multiple access (CDMA) system, or timeslot and frequency in a TDMA/FDMA system) may be assigned to more than one subscriber unit.

Any downlink signals sent are received by a subscriber unit, and the received to signal at such receiving subscriber unit is processed as is well known in the art.

When a signal is sent from a remote unit to a base station (i.e., communication is in the uplink), the base station typically (and not necessarily) is one that uses a receiving antenna array (usually, and not necessarily the same antenna array as for transmission), the base station signals received at each element of the receiving array are each weighted in amplitude and phase by a receive weight (also called spatial demultiplexing weight), this processing called spatial demultiplexing, all the receive weights determining a complex valued receive weight vector which is dependent on the receive spatial signature of the remote user transmitting to the base station. The receive spatial signature characterizes how the base station array receives signals from a particular subscriber unit in the absence of any interference. In the downlink (communications from the base station unit to a subscriber unit), transmission is achieved by weighting the signal to be transmitted by each array element in amplitude and phase by a set of respective transmit weights (also called spatial multiplexing weights), all the transmit weights for a particular user determining a complex valued transmit weight vector which also is dependent on what is called the "downlink spatial signature" of the remote user which characterizes how the remote user receives signals from the base station absence of any interference. When transmitting to several remote users on the same conventional channel, the sum of weighted signals is transmitted by the antenna array. This invention is primarily concerned with downlink communications, although the techniques certainly are applicable also to uplink communications when the subscriber unit also uses an antenna array for transmitting and omnidirectional transmission from such a subscriber unit is desired.

In systems that use antenna arrays, the weighting of the signals either in the uplink from each antenna element in an array of antennas, or in the downlink to each antenna element is called spatial processing herein. Spatial processing is useful even when no more than one subscriber unit is assigned to any conventional channel. Thus, the term SDMA shall be used herein to include both the true spatial multiplexing case of having more than one user per conventional channel, and the use of spatial processing with only one user per conventional channel. The term channel shall refer to a communications link between a base station and a single remote user, so that the term SDMA covers both a single channel per conventional channel, and more than one channel per conventional channel. The multiple channels within a conventional channel are called spatial channels. For a description of SDMA systems, see for example, U.S. Pat. No. 5,515,378 (issued May 7, 1996) and U.S. Pat. No. 5,642,353 (issued Jun. 24, 1997) entitled SPATIAL DIVISION MULTIPLE ACCESS WIRELESS COMMUNICATION SYSTEMS, Roy, III, et al., inventors, both incorporated herein by reference; U.S. Pat. No. 5,592,490 (issued Jan. 7, 1997) entitled SPECTRALLY EFFICIENT HIGH CAPACITY WIRELESS COMMUNICATION SYSTEMS, Barratt, et al., inventors, incorporated herein by reference; U.S. patent application Ser. No. 08/735,520 (filed Oct. 10, 1996), entitled SPECTRALLY EFFICIENT HIGH CAPACITY WIRELESS COMMUNICATION SYSTEMS WITH SPATIO-TEMPORAL PROCESSING, Ottersten, et al., inventors, incorporated herein by reference; and U.S. patent application Ser. No. 08/729,390 (filed Oct. 11, 1996) entitled METHOD AND APPARATUS FOR DECISION DIRECTED DEMODULATION USING ANTENNA ARRAYS AND SPATIAL PROCESSING, Barratt, et al., inventors, incorporated herein by reference. Systems that use antenna arrays to improve the efficiency of communications and/or to provide SDMA sometimes are called smart antenna systems. The above patents and patent applications are collectively referred to herein as "Our Smart Antenna Patents."

Because broadcasting implies the simultaneous transmission of data over a common channel to a dispersed set of subscriber units, it is desirable to find methods for using the multiple element antenna array and associated transmitter hardware for broadcasting both common downlink channel information and traffic information intended for one or more particular users.

In certain applications, there is a requirement that certain conventional channels be radiated with an omnidirectional pattern. In the GSM family of protocols (a TDMA/FDMA system), for example, there is a requirement that all base stations radiate RF energy omnidirectionally on all logical channels that are borne by the carrier (the FDMA conventional frequency channel in the TDMA/FDMA system) designated as the "BCCH carrier," while emissions on other channels may be performed in a directional manner. For example, on the BCCH carrier, one timeslot is reserved for BCCH messages. Some of the other timeslots may be used for TCH with one or more users.

When SDMA is used, some of these other timeslots may be used for communicating with more than one remote user by transmitting the information directionally to these users. With normal SDMA, independent of the number of users per conventional channel, the RF energy patterns would be highly directional so that the net RF energy within the cell in these timeslots is minimized subject to the requirement for acceptable signal quality. This however would conflict with the GSM requirement that the net energy on all timeslots on the BCCH carrier be transmitted omnidirectionally. Thus there is a need in the art for a method and apparatus for transmitting information to one or more users directionally with the net energy being transmitted omnidirectionally.

Sectorized systems using antenna arrays are known in the art. In a sectorized system, rather than true omnidirectional broadcasting (360° of azimuth coverage) there is a need in the art for broadcasting efficiently in the intended coverage region (i.e., the sector) of the antenna array and associated electronics. Thus, in this document, the term "omnidirectional" will be taken in the following sense: 1) "omnidirectional" means approximately, nearly omnidirectional ("NOR"); 2) in an unsectorized cellular system, omnidirectional will mean NOR for 360° of azimuth coverage, and 3) in a sectorized system, omnidirectional will mean nearly omnidirectional in the intended sector width (e.g., 120° of azimuth coverage for 120° sectors).

Desirable Characteristics

A successful strategy will have the following characteristics:

approximately constant gain as a function of azimuth and other quantities that describe the location of the remote receiver;

low variation in the transmit power of each element in the array so that good advantage is taken of all elements in the array and scaling issues that arise in practice are minimized;

significant pattern gain relative to that achievable with a single element of the array transmitting at comparable power to the individual transmission powers of the array elements; and low total radiated energy so that all elements are being used efficiently.

While a NOR pattern usually is desired, there may be situation where a different pattern is desired. For example, there may be situations where it is desired to avoid a particular region or regions, or where it is desired not to exceed a certain power level in one or more particular regions. Similarly, there may be situations where it is desired to have a NOR pattern at most regions while one or two other regions may have a NOR pattern at twice or some other multiple of the power level that most NOR regions have.

The property "low relative radiated power" herein means low radiated power per antenna element relative to the power required to effect a comparable radiation pattern (comparable in range, azimuth and elevation) using a single antenna element of the same gain (e.g., as measured in dBi) as the individual elements of the antenna array. Since the difference in radiated power may translate to different power amplifier requirements, and very high power amplifiers are relatively expensive, in some situations, even 1 dB may be a significant difference in radiated power. In more general cases, 3 dB will be considered a significant difference in radiated power.

The Prior Art

A common method for so broadcasting data is to use an omnidirectional antenna so that the RF carrier is transmitted more-or-less uniformly in all directions. This omnidirectional radiation pattern appears to be a reasonable choice for mobile cellular system in which the subscriber units can be arbitrarily positioned within the cell area. In the case of a smart antenna system, one can achieve such an omnidirectional pattern either by using a separate single omnidirectional antenna (such as a vertical dipole) or one of the elements in the antenna array (assumed to have m elements). Unfortunately, this would require increasing the total transmitter power in that antenna element (or separate antenna) compared to the power levels used in ordinary TCH communications when all the antenna elements are operational, to achieve similar range for the traffic and control channels. The option of increasing power may not be allowed by regulation and, even if allowed, may not be a practical choice because, for example, power amplifier costs tend to increase rapidly with power.

The prior art method of transmitting from only a single array element would satisfy the desirable criteria of approximately constant gain as a function of azimuth and other quantities that describe the location of the remote receiver, and of low total radiated energy, but would not give low variation in the transmit power of each element in the array so that good advantage is taken of all elements in the array and scaling issues that arise in practice are minimized, and would not provide significant pattern gain relative to that achievable with a single element of the array transmitting at comparable power to the individual transmission powers of the array elements. In addition, transmitting from only one antenna would not enable simultaneous communications with several users on the same conventional channel.

Alternatively, the antenna array radiation pattern may be controlled through applying pre-processing to any signals prior to spatial processing. U.S. Pat. No. 5,649,287, (issued Jul. 15, 1997), entitled ORTHOGONALIZING METHODS FOR ANTENNA PATTERN NULLFILLING, Forssen, et al., inventors, discloses a method for broadcasting information in a cellular communication system comprising at least one base station with an antenna array and a plurality of mobile stations. The common information is preprocessed to create orthogonal signals. The orthogonal signals are then beamformed so that the orthogonal signals are delivered to the different beams in the array antenna. The orthogonal signals are transmitted and then received at one or more mobile stations. The signals are then processed at the mobile station to decipher the common information from the orthogonal signals. The orthogonalizing signals to be transmitted to the mobile stations are formed so as to prevent nulls from occurring in the antenna pattern.

It is not clear how the Forssen et al. method can be adapted to transmit some signals directionally (to simultaneous users on any conventional channel) while maintaining a net omnidirectional radiation pattern. In addition, the Forssen et al. method requires preprocessing (orthogonalizing) the control signal to form m orthogonal signals which are then fed to a beamformer. That is, any signal to be broadcast is first transformed to a set of uncorrelated signals. This requires extra hardware or processing steps. In addition, the particular embodiment described by Forrsen et al. requires a high performance equalizer at the subscriber unit to resolve the orthogonalized signals from the other various lobes. It would be desirable to use a system in which any signal to be transmitted is weighted only in phase and amplitude without requiring an additional step (e.g., orthogonalization).

Thus there is a need in the art for methods for omnidirectional downlink transmitting that use the existing communications system apparatus including the existing antenna elements in an antenna array to achieve acceptable omnidirectional performance with low relative radiated power for both the case of a single user per conventional channel, and the case of multiple users per conventional channel. Thus there also is a need in the art for an apparatus that achieves this.

There also is a need in the art for methods and apparatuses for downlink transmission that achieve a desirable, possibly not NOR radiation pattern.

SUMMARY

One object of the invention is a method for omnidirectional downlink transmitting that use the existing communications system apparatus including the existing antenna elements in an antenna array to achieve acceptable omnidirectional performance with low relative radiated power for both the case of a single user per conventional channel, and the case of multiple users per conventional channel. Another object is an apparatus that achieves this.

Yet another object is a method and apparatus for downlink transmission that achieve a desirable, possibly not NOR radiation pattern.

These and other objects are provided for in the various aspects of the disclosed invention.

One aspect of the invention disclosed herein is a method for transmitting a downlink signal with a desirable radiation pattern to subscriber units from a communication station which has an array of antenna elements. In the communication station, there are one or more signal processors programmed (in the case of programmable signal processors) to weight any downlink signal in phase and amplitude, the weighting describable as a complex valued weight vector. The weighted signals are fed to the inputs of transmit apparatuses whose outputs are coupled to the antenna elements. The method includes selecting a first weight vector designed for transmitting with low relative radiated power to achieve the desired radiation pattern over a desired sector, where low relative radiated power means low radiated power per antenna element relative to the power required to effect a comparable radiation using a single antenna element of the same gain (e.g., as measured in dBi) as the individual elements of the antenna array. A range of azimuths or elevations or both may define the desired sector. Typically but not necessarily, the desired pattern is a NOR pattern. In the preferred embodiment, the weight vector selected is that weight vector that minimizes a cost function of the weight vector, the cost function including an expression of variation of the radiation pattern resulting from transmitting using the weight vector from the desired radiation pattern over the desired sector. In the preferred embodiment, the cost function includes also an expression of the total power transmitted from the antenna elements by using the weight vector and an expression of the variations in transmitted power among the antenna elements when using the weight vector. In this embodiment, the downlink signal is weighted with the selected weight vector using the one or more signal processors to form a set of weighted downlink antenna signals which each have an intended antenna element in the array. To transmit the downlink signal, each weighted downlink antenna is fed via its intended antenna element's associated transmit apparatus to its intended antenna element.

In the particular embodiment disclosed, the communication station is part of a base station which operates using a variant of the GSM air interface in a cellular communication system. The invention is not limited to any particular multiplexing scheme or air interface standards. Other embodiments may use any analog or digital multiplexing scheme (e.g., FDMA, TDMA/FDMA, CDMA, etc.) and/or any air interface standards (e.g., AMPS, PHS, etc.).

Another aspect of the invention disclosed herein is a method for simultaneously transmitting one or more downlink signals from a communication station to one or more subscriber units over a single conventional channel with an overall desirable radiation pattern over a desired sector, each downlink signal having one or more intended subscriber units. For simultaneous transmission to several users over the same conventional channel, the communication station includes an array of antenna elements, a transmit apparatus connected to output to each antenna element, and one or more signal processors programmed (in the case of programmable signal processors) to spatially multiplex the downlink signals by weighting any downlink signal in phase and amplitude, and adding the weighted signals. The weighting is describable as a complex valued weight vector. The summed weighted signals from the signals processors are fed to the inputs of transmit apparatuses. The method includes selecting a set of desirable weight vectors designed for producing an overall desirable radiation pattern over a desired sector, the set including a desirable weight vector designed for transmitting to each intended subscriber unit. A range of azimuths or elevations or both may define the desired sector. Typically but not necessarily, the overall desirable pattern is a NOR pattern. Each intended subscriber unit has a location that is (at least approximately) known, and these known locations are used in the selecting of the desirable weight vectors. In the preferred embodiment, the selecting includes defining a set of corresponding regions, each including at most one subscriber unit, such that the union of all the corresponding regions substantially covers the desired sector. Each desirable weight vector is selected for transmission to one of the corresponding regions, and all the desirable weight vectors are the weight vectors that minimize a cost function of possible weight vectors which includes an expression of the variation from the desirable radiation pattern of the net overall radiation pattern resulting from transmitting using the plurality of weight vectors. The preferred embodiment cost function also includes an expression of the total power transmitted from the antenna elements using each weight vector, an expression of the variations in transmitted power among the antenna elements using each weight vector, and an expression of the energy received in unintended corresponding regions for each weight vector. The number of desirable weight vectors may exceed the number of simultaneous users, in which case one or more dummy signals are transmitted using the weight vectors not associated with any remote users. The plurality of downlink signals (and dummy signals, if any) are spatially multiplexed to form a set of summed and weighted downlink antenna signals, each summed and weighted downlink antenna signal having an intended antenna element in the array. To transmit the downlink (and dummy) signals, each weighted downlink antenna is fed via its intended antenna element's associated transmit apparatus to its intended antenna element.

In one variation, the partitioning and selecting is repeated for several situations and the resulting weight vectors stored until a sufficient number of situations are stored.

For actual transmission to the one or more remote users, the desirable weight vectors of the situation appropriate for the locations of the subscriber units are recalled from memory.

In another variation appropriate for the case of the antenna array being approximately uniformly distributed, a prototype situation (or more than one prototype situations) is stored, and, based on the locations of the remote users, a translation of the regions of the prototype situation is determined to ensure that there is no more than one subscriber unit per translated region and that the locations of the subscriber units are adequately separated. The prototype weight vectors are shifted according to the determined translation, and the shifted weight vectors are used for the spatial multiplexing.

In an improvement of the variation, when the downlink signal transmissions are periodically repeated, the shift in each repetition is dithered around the determined shift, the dithering preferably includes adding a randomized shift to the determined shift.

Also disclosed in another aspect of the invention is a communication station for transmitting one or more downlink signals simultaneously over the same conventional channel to one or more subscriber units to achieve a desired overall radiation pattern over a desired sector. The communication station includes an array of antenna elements, selecting means for selecting weight vectors designed for the transmitting through the array to achieve the desired overall radiation pattern over the desired sector and one or more signal processors for weighting the downlink signals in phase and amplitude according to the weight vectors and adding the weighted signals to form a set of weighted downlink antenna signals. Each summed and weighted downlink antenna signal includes an intended antenna element in the array and a set of associated transmit apparatuses for transmitting the set of weighted downlink antenna signals using the array. Each associated transmit apparatus has an input for receiving one of the summed and weighted downlink antenna signals. Each antenna element is coupled to the output of one of the associated transmit apparatuses. Each associated transmit apparatus has an input for receiving one of the weighted downlink antenna signals.

In the preferred embodiment the selecting means is the one or more signal processors. These select those weight vectors that minimize a cost function of the weight vectors, the cost function including an expression of variation of the overall radiation pattern resulting from transmitting using the weight vectors from the desired overall radiation pattern over the desired sector. The preferred embodiment cost function also includes an expression of the total power transmitted from the antenna elements using each weight vector, an expression of the variations in transmitted power among the antenna elements using each weight vector, and an expression of the energy received in unintended corresponding regions for each weight vector.

BRIEF DESCRIPTION OF THE DRAWINGS

The present invention will be more fully understood from the detailed preferred embodiments of the invention, which, however, should not be taken to limit the invention to any specific embodiment but are for explanation and better understanding only. The embodiments in turn are explained with the aid of the following figures.

DETAILED DESCRIPTION OF THE PREFERRED EMBODIMENTS

Figure 1A:
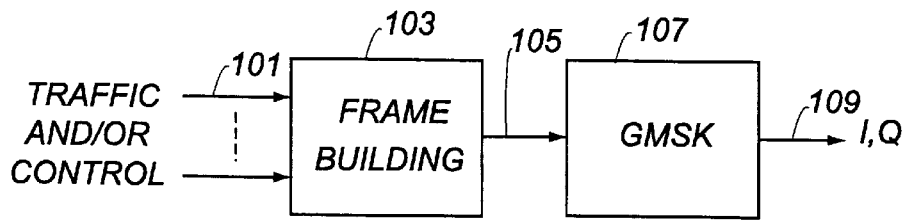
FIG. 1(a) shows a signal flow representation of building a GMSK modulated frame in a GSM system.

The invention preferably is implemented as part of a wireless communication system with SDMA, in particular a cellular SDMA system. In one implementation, the system operates with fixed subscriber unit locations and uses the PHS communications protocol. Wireless systems with fixed locations are sometimes called wireless local loop (WLL) systems. In a second implementation, the subscriber units may be mobile, and the system again uses the PHS protocol, which is suitable for low mobility applications. In a third implementation, the subscriber units again may be mobile, and the GSM communications protocol is used. It will be clear to those or ordinary skill in the art that the invention may be implemented in any SDMA system with one or more than one spatial channel per conventional channel, and having mobile, fixed, or a combination of mobile and fixed subscriber units.

The preferred embodiment described will be for a cellular system with uses SDMA and a variant of the GSM protocol. How to adapt these for other air interfaces and for other multiplexing schemes would be clear to one of ordinary skill in the art. While the particular embodiment is for a digital cellular system, the invention also is applicable to analog communication systems, which use SDMA, for example, for the common AMPS system (modified to include SDMA).

An overview of GSM

GSM is a TDMA/FDMA system for mobile cellular communications. A subscriber unit generally is called a mobile station (MS). The base stations are called base transceiver stations (BTSs). A base station controller (BSC) manages the radio resources for one or more BTSs, such resources including channel setup/teardown, handovers, and frequency hopping.

In GSM, frequency channels (called "carriers") are separated by 200 kHz. GSM uses frequency division duplexing, which means that downlink and uplink communications between a BS and a MS occur at different frequencies. In standard GSM, up to 25 MHz each is available for the downlink carriers (880–915 MHz) and the uplink carriers (925–960 MHz). One or more carriers are assigned to each BS. For DCS-1800, the uplink and downlink ranges are 1710–1785 MHz and 1805–1880 MHz, respectively, while for PCS-1900, the uplink and downlink ranges are 1850–1910 MHz and 1930–1990 MHz, respectively.

Each carrier is divided in time into 8 time slots, each slot (called a burst) being 15/26 ms long. Each 8 slots are combined into a TDMA frame, thus each TDMA frame is 120/26 ms long. Traffic channels (TCHs) and control channels (CCHs) are defined by the position of their corresponding burst period within the frame.

A traffic channel (TCH) is used to carry speech and data. A full rate traffic channel (TCH/F) carries information at a gross rate of 22.8 kbps while a half rate traffic channel (TCH/H) carries information at the gross rate of 11.4 kbps. Traffic channels appear in 26 TDMA frame groups, and such a group is called a multiframe. Thus a TCH multiframe is 120 ms long.

Common control channels can be accessed both by idle mode and dedicated mode mobiles. Idle mode mobiles use the common channels to exchange the signaling information required to change to dedicated mode. Mobiles already in dedicated mode monitor the surrounding base stations' control carriers for handover and other information. The common channels are defined within a 51-frame multiframe, so that dedicated mobiles using the 26-frame multiframe TCH structure can still monitor control channels. The common channels include:

Broadcast Control Channel (BCCH): The BCCH continually broadcasts, on the downlink, information including base station identity, frequency allocations, and frequency-hopping sequences.

Frequency Correction Channel (FCCH) and Synchronization Channel (SCH): FCCH and SCH are downlink channels used to synchronize the mobile to the frequency and time slot structure of a cell by defining the boundaries of burst periods, the time slot numbering, and carrier offset. Every cell in a GSM network broadcasts exactly one FCCH and one SCH. The FCCH and SCH by definition are sent on time slot number 0 within a TDMA frame on the BCCH carrier.

Random Access Channel (RACH): The RACH (an uplink channel) is used by the mobile to request access to the network.

Paging Channel (PCH): The PCH is a downlink channel used to alert a mobile station of an incoming call.

Access Grant Channel (AGCH): The AGCH is a downlink channel used to allocate a TCH or a specific associated control channel, called a SDCCH, to a mobile station for signaling (in order to obtain a dedicated channel), following a request on the RACH.

Dedicated Control Channels: These include the Slow TCH/F Associated Control Channel (SACCH/TF), the Fast TCH/F Associated Control Channel (FACCH/F), the Slow TCH/H Associated Control Channel (SACCH/TH), the Fast TCH/H Associated Control Channel (FACCH/H), and other dedicated control channels associated with TCH traffic.

There are four different types of bursts used for transmission in GSM. The normal burst is used to carry data and most signaling information, and has a total length of 156.25 bits, made up of two 57-bit information streams, a 26-bit training sequence used for equalization, one stealing bit for each information block (used for FACCH), 3 tail bits at each end, and an 8.25-bit guard sequence. The 156.25 bits are transmitted in 15/26 ms (0.577 ms), giving a gross bit rate of 270.833 kbps. The F-burst, used on the FCCH, and the S-burst, used on the SCH, have the same length as a normal burst, but a different internal structure, which differentiates them from normal bursts, thus allowing synchronization. The fourth type of burst is the access burst, which is shorter than the normal burst, and is used only on the RACH.

Description of the particular GSM implementation

The present invention is applicable to any communication station which uses an antenna array of antenna elements and that has means for adjusting the phase and amplitude of a signal so that each antenna element transmits a version of the signal with the phase and amplitude adjusted according to an amplitude scaling and phase shift. As will be understood by those of ordinary skill in the art, each antenna element's amplitude and phase weighting for a particular communication signal can be represented by a complex valued weight, and the set of complex valued weights for that signal for all the antenna elements can be represented by a complex valued weight vector.

The preferred embodiment of the present invention is a test system, which uses the PCS-1900 variant of the GSM protocol and that transmits in PCS-1900 frequencies (around 1.9 GHz). The test system includes a GSM BS. Because the present invention is concerned with transmitting from a communication station, only those elements of the BS that deal with such transmission are described herein. How to modify the embodiment described herein for implementation on other systems, for example on cellular systems that use the PHS protocol or even non-digital systems such as AMPS, or even non-cellular communication stations, will be clear to one of ordinary skill in the art.

Full rate GSM voice data is made up of 260 bit linear prediction coded (LPC encoded) voice packets at 50 Hz. A 260 bit GSM LPC speech packet contains three types (groups) of bits, where each group is classified according to its importance, and each group thus is protected by different types of protection encoding (parity and convolutional, convolutional only, or no encoding). All groups are interleaved to form a 456-bit output packet.

Successive 456-bit channel-encoded voice packets are interleaved with one another across eight radio bursts. 8 bursts with 114 bits per burst give a total of 912 bits, so, in fact, two voice packets are required for the construction of any TCH burst. In addition, the packets are skewed relative to one another.

In addition to voice data, several other types of data may be transmitted according to the GSM protocol. In addition, using SDMA, several spatial channels (in general, any number up to the number of antenna array elements per TCH) may exist on any timeslot in any carrier. The notation "TS-SpChan" is used herein for a spatial channel and time-slot, bearing, for example, a particular TCH. For example, in the particular hardware used for the preferred embodiment, a single carrier system has the ability to multiplex up to three spatial channels (this limitation being because of processing power of all the processors), thus there are up to 3×7=21 TS-SpChans since one of the eight slots is used for control in this embodiment. Under ideal conditions, each of these can contain a full or half rate voice channel with associated signaling.

In the preferred embodiment of the GSM system, on each downlink TS-SpChan, only several combinations of channels are used, as permitted by the GSM standard. Thus, each carrier has 8 time-slots, each (carrier, time-slot except timeslot 0) has up to 3 spatial channels, each (carrier, time-slot, spatial channel) has a downlink channel combination, and each downlink channel combination consists of a group of logical channels. In addition, each (carrier, time-slot, spatial channel) has a set of spatial multiplexing weights (a weight vector) associated with it. It should be noted, however, that standard GSM does not include the concept of having multiple TCHs on a single timeslot on the same carrier.

Data destined for multiple mobiles and from multiple logical channels are put together to form a GSM downlink frame. For example, time-slot 0 might contain a synchronization control channel (SCH) burst, time-slot 1 might contain TCH/F data for one mobile, time-slots 2–5 might be unused, time-slot 6 might contain slow-associated control channel (SACCH) data for another mobile, and time-slot 7 might contain TCH/F data for yet another mobile. All this data together with training sequences and other information is assembled into a 1250 bit frame for transmission. Bits 0–147 are time-slot 0, bits 148–155 are inter-burst guard bits, bits 156–303 are time-slot 1, etc. One extra inter-burst guard bit is inserted between time-slots 3 and 4 and between time-slots 7 and 0.

The GSM frames are Gaussian Minimum Shift Key (GMSK) modulated according to the GSM specifications. In the particular embodiment, GMSK modulation is carried out by using a lookup table to generate waveforms. The GSM processor of the particular embodiment uses a single digital signal processor DSP for each antenna element, and it is this DSP that is used to carry out the modulation method and the spatial processing.

FIG. 1(*a*) shows a "signal flow" representation of a subsystem for building a GMSK modulated frame in a GSM system. An actual apparatus for frame building would not have this structure; it is shown to help explain the process of building a frame. Frame builder 103 takes channel encoded voice packets or control packets (collectively 101) and formats this data for transmission in bursts according to the GSM air interface standard, and constructs GSM frames 105 of 8 timeslots. FIG. 1(*a*) reflects what happens at one particular timeslot and for a particular spatial channel if at that timeslot for the particular frame there is more than one spatial channel. The frame data (at any time) 105 are modulated by Gaussian Minimum Shift Keying (GMSK) modulation by GMSK modulator 107 to produce a baseband complex values (i.e., I and Q) signal 109. Building GSM frames and carrying out the necessary GSM (GMSK) modulation are done by all GSM base stations and are well known in the art. In our implementation, the baseband data 109 is one-and-one-half-times oversampled digital I, Q data (i.e., I, Q data sampled at 1.5×270.833 kHz).

Intimately coupled with the modulation is the spatial multiplexing method. It is the modulated baseband signals that are spatially multiplexed. This is shown in FIG. 1(*b*). At any particular point in time (that is during any timeslot), there may be more than one signal that is to be transmitted. FIG. 1(*b*) shows three such spatial channels of baseband signals, the signals denoted 109.1, 109.2, and 109.3, respectively. Note that FIG. 1(*b*) captures the processing at some particular timeslot. At another timeslot, a different number of spatial channels may be transmitted—for example, only one channel.

In the particular embodiment, the spatial multiplexing of unit 111 is carried out in a per antenna basis by a DSP associated with a particular antenna element. In an m antenna system, ni such DSP are therefore used in our system. The spatial multiplexing occurs after GMSK waveform generation. Thus the GMSK modulation and spatial multiplexing are coupled in the same DSP for efficiency, and this DSP is called the transmit modulation and multiplexing DSP herein. The coupling means that each (frame, time-slot, spatial channel) burst content data and the corresponding spatial multiplexing weight vector must be written to the transmit modulation-and-multiplexing DSPs.

In the implementation of the GSM system of the preferred embodiment, each channel organization is a linked list of pointers to subroutines which, when sequenced, generates the appropriate sequence of burst packets for the transmit modulation-and-multiplexing DSPs.

During a particular timeslot, for K spatial channels, using K complex-valued weight vectors $w_1, w_2, \ldots, w_j, \ldots, w_K$, respectively, the jth weight vector being the row vector $$w_j=[w_{j1}, \ldots, w_{ji}, \ldots, w_{jm}],$$

the spatial processing and GMSK modulation carried out by the transmit modulation-and-multiplexing DSP associated with the ith antenna element (of a total of m antenna array elements) may be mathematically described as $$y_i(n) = \sum_{j=1}^{K} w_{ji}^* GMSK(s_j(n)),$$

where ( )* indicates the complex conjugate, n is the sample in time during the particular timeslot, $y_i(n)$ is the output (in baseband) to be transmitted (in RF) by the ith antenna element, and $GMSK(s_j(n))$ is the GMSK-modulated baseband waveform of the jth spatial channel at the time sample n.

Figure 1B:
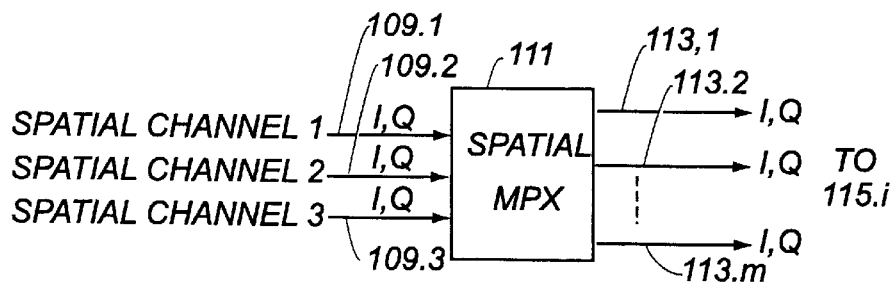
FIG. 1(b) shows a spatial multiplexer for spatially multiplexing three spatial channels using weight vectors w1, w2, and s3 to form m complex valued (I, Q) signals for transmission by m antenna elements.

Thus FIG. 1(b) shows the spatial processing using all m transmit modulation-and-multiplexing DSPs for spatially multiplexing three spatial channels using weight vectors $w_1$, $w_2$, and $w_3$ to form m complex valued (I, Q) signals for transmission by m antenna elements. Each transmit modulation-and-multiplexing DSP produces one such output for one antenna element.

Figure 1C:
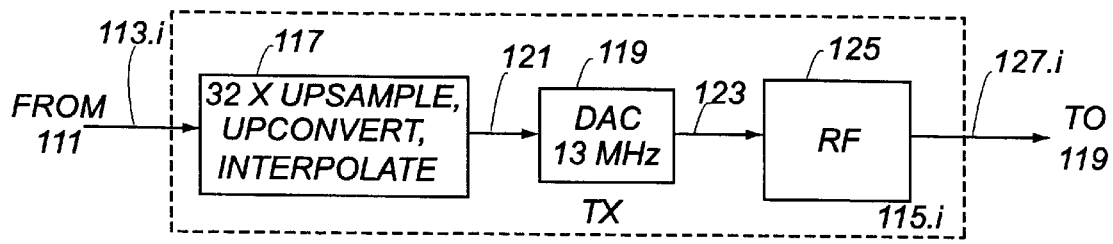
FIG. 1(c) shoes the structure of a transmitter for one of the antenna elements.
Figure 1D:
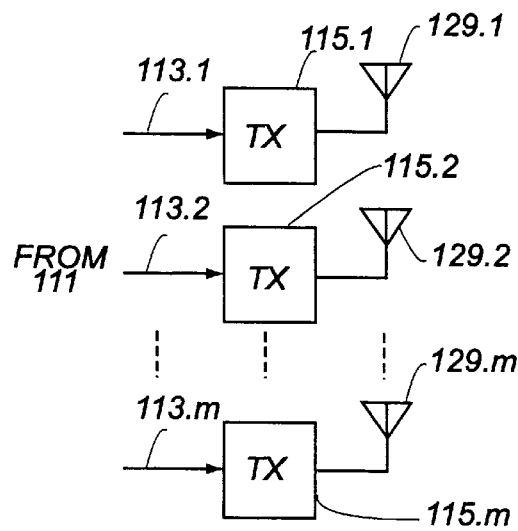
FIG. 1(d) shows m transmitters each as in FIG. 1(c), for transmitting the m spatially multiplexed signals from the spatial multiplexer of FIG. 1(b)

FIG. 1(d) shoes the how these m baseband signals 113.1 through 113.m, are transmitted by the respective transmitters 115.1 through 115.m, to generate m RF signals which are coupled to antenna elements 129.1 through 129.m, respectively.

While any suitable transmitters may be used, the particular embodiment used transmitters with the structure shown in FIG. 1(c), which shows one such transmitter for one antenna element. One-and-one-half-times oversampled baseband signal 113.i from the ith transmit modulation-and-multiplexing DSP is first digitally 32 times upsampled, upconverted, and interpolated by unit 117. The resulting signal is then converted at 13 MHz to analog by digital to analog converter (DAC) 119, and the resulting signal 123 is then upconverted and amplified, in analog, by RF transmitter 125.

The term transmitter apparatus, each such apparatus associated with an antenna element, shall refer to all the apparatus, including digital and analog hardware, cables, etc., that is associated with converting a baseband signal to an amplified one at RF for transmission through an antenna element, such an apparatus being well known to one of ordinary skill in the art.

Mathematical Description

While the particular embodiment described herein is for a FDMA/TDMA system using a particular modulation format, the invention is not limited to any type of modulation or multiplexing, and thus may be used in any system, including analog systems and digital systems that use TDMA, FDMA, FDMA/TDMA or CDMA system.

Let the base station (BS) have an antenna array of m antenna elements. Let $\Theta$ represent the parameter set describing the range of locations of a remote receiver (the mobile station, denoted MS) in the BS's antenna array's far-field. That is, the target coverage of the RF pattern for a particular user. The set $\Theta$ could represent a set of azimuth angles, e.g., $$\Theta=[30°, 150°],$$

where $[\theta_1, \theta_2]$ denotes the range of azimuth angles from $\theta_1$ to $\theta_2$. Alternatively, $\Theta$ could be set of azimuths and depression angles and polarizations, e.g., $$\Theta=[30°, 150°]\times[-30°, -5°]\times\{V, H\}$$

which is the range set of azimuths from 30° to 150° with elevations from −30° to −5° with V or H polarization. In the particular embodiment, the patterns were designed to provide coverage of a particular range only of azimuths, and the method of the present invention is certainly not limited to such a range definition.

In many systems, including those using the GSM protocol of the preferred embodiment, all signals may be assumed to be approximately narrowband in the sense that the center frequency is known and the ratio of the signals' bandwidths to their center frequencies are much less than unity. Define $a(\theta)$, $\theta \in \Theta$, to be an m-vector containing the relative phases and amplitudes of the signals received from each of the antenna array elements at the remote receiver (the MS) when those elements are each transmitting an identical narrowband signal. $a(\theta)$ so defined is sometimes called the steering vector. Several antenna array geometries are possible, and the invention is not limited to any particular arrangement. One example, used in the preferred embodiment, is a linear array of m identical, omnidirectional antenna elements arranged with uniform spacing along a line, the spacing denoted as d. For such a geometry, it can be shown that the steering vector is (within a constant of proportionality), in an environment essentially free of reflecting or diffracting objects $$a(\theta)=[1 e^{-j2\pi d \cos(\theta)/\lambda} \ldots e^{-j2(m-1)\pi d \cos(\theta)/\lambda}]^T, \quad \text{Eq. 1}$$

where $\lambda=c/f$, $( )^T$ indicates the matrix transpose, c is the speed of propagation, $f$ is the RF frequency, and $\theta$ is the azimuth or cone angle corresponding to the MS's location measured relative to the axis of the antenna array. If each of the antenna array elements had an omnidirectional elevation response, but non-constant and identical azimuth response, denoted $e(\theta)$, then it can be shown that the steering vector is $$a(\theta)=e(\theta)[1 e^{-j2\pi d \cos(\theta)/\lambda} \ldots e^{-j2(m-1)\pi d \cos(\theta)/\lambda}]^T. \quad \text{Eq. 2}$$

Define the transmit manifold, $T(\Theta)$ as the set of relative phases and amplitudes of the signals received from each of the antenna array elements at the remote receiver for all $\theta$s which are in set $\Theta$. That is, $$T(\Theta)=\{a(\theta), \theta \in \Theta\} \quad \text{Eq. 4}$$

In the preferred embodiment, it is assumed that the $T(\Theta)$ is known. Methods of accurately estimating $T(\Theta)$ are known, and such methods include analytical modeling in combination with calibration of the array electronics, and direct measurements in the field. See, for example, Our Smart Antenna Patents for an example of how to determine steering vectors and how to determine the location of remote users in a SDMA system, together with U.S. Pat. No. 5,546,090 (Aug. 13, 1996) entitled METHOD AND APPARATUS FOR CALIBRATING ANTENNA ARRAYS, Roy et al., inventors, incorporated herein by reference in its entirety, which includes an example of calibrating an SDMA system.

The complex valued m-dimensional row weight vector, w, contains the complex weightings used to distribute a complex valued (in-phase I and quadrature Q) signal s(t) across the antenna array elements to achieve a particular radiation pattern as a function of θ. When a weight vector w is used for transmit spatial processing, the m complex valued signals applied to the antenna elements (in baseband) are given by the elements of the complex valued m-row vector $$w^*s(t)=[w_1^*s(t)\ w_2^*s(t)\ \ldots\ w_m^*s(t)],\qquad \text{Eq. 5}$$

where ( )* indicates the complex conjugate and s(t) is the baseband signal to be transmitted (GMSK modulated, in the preferred embodiment using GSM), so that the net signal received by a MS at location θ is then proportional to the complex valued quantity $$w^*a(\theta)s(t). \qquad \text{Eq. 6}$$

In the preferred embodiment, each of the signal to be transmitted is generated by the transmit modulation and multiplexing DSPs, as described above herein, and other implementations certainly are possible within the scope of the present invention, as would be clear to one of ordinary skill in the art.

Single Logical Channel Per Unit Time

The preferred embodiment to determine the weight vector w which achieves the is desired characteristics, e.g., near omnidirectional (NOR) characteristics, includes defining a cost function of weight vector w which measures deviations from the desired response pattern, and then solving the minimization problem of finding the weight vector w which minimizes the cost function. Many cost functions are possible for this embodiment. In the case of a single logical channel per unit time and, for a NOR pattern, the preferred cost function that is a measure of the desired characteristics for omnidirectional broadcasting is:

$$J(w) = \alpha_1 |||w| - |\overline{w}|[1\ \ldots\ 1]||_2 + \alpha_2 ||w||_2 + \qquad \text{Eq. 7}$$
$$\alpha_3 \left\{ \int_{\Theta'} [|w^*a(\theta)| - g_d]^2 d\theta \right\}^{\frac{1}{2}},$$

where |w| is the vector of amplitudes of the elements of vector w, $|\overline{w}|$ is the average value of all the elements in |w|, and $||w||_2$ is the L2 norm (i.e., the "length") of vector w. The first term of the cost function expression (Eq. 7) is a measure of variations in transmission power among the antenna elements, the second term is an expression of the total transmit power, and the third term is a measure of the gain deviation from some constant target gain value denoted $g_d$. The $\alpha_i$ are positive scale factors which provide relative weighting for the cost function components. The integration in the third term is over Θ', a subset of Θ, in particular, the portion of the parameter space Θ over which the cost function minimization is to be performed (e.g., over an azimuthal sector). Other cost functions may be used which, for example, impose a greater "cost" for ripple in the response patterns in some of the region, or to achieve a desired non-NOR pattern, etc. The particular cost function may be left to the design engineer and depends on the relative importance of some of the measures that are in the cost function.

The optimal w to use for omnidirectional (or desired pattern) broadcasting is then the w that minimizes the cost function J(w). It will be rare that J(w) can be minimized analytically. Instead, in the preferred embodiment, a numerical minimization approach is used. In particular, we have used a quasi-Newton method and treated the real and imaginary components of w as a collection of 2m real parameters.

How to carry out such a numerical minimization would be clear to one of ordinary skill in the art. For the actual implementation, the interactive matrix manipulation program MATLAB (The Mathworks, Inc., Natick, Mass.), was used. MATLAB, which runs on most popular computer operating systems, integrates numerical analysis, matrix computation, signal processing, and graphics in a single environment where problems and solutions are expressed mathematically, and without the overhead of traditional programming languages, in order to support more elaborate applications. The basic data element is a matrix that does not require dimensioning. It enables the solution of numerical problems in a fraction of the time that it would take to write a program in a language such as FORTRAN, Basic, or C. Specialized "toolboxes" are available and provide comprehensive collections of MATLAB functions (M-files) that extend the MATLAB environment in order to solve particular classes of problems. Such toolboxes include signal processing, control systems design, dynamic systems simulation, systems identification, neural networks, optimization, etc. In particular, the MATLAB Optimization Toolbox was used to solve the optimization problem. The MATLAB Optimization Toolbox includes a quasi-Newton optimization method.

It should be stated again that while it usually is desirable to achieve a NOR pattern, sometimes other considerations may be more important. Thus, in another aspect of the invention, the method may be applied to achieve other, not necessarily NOR patterns. In general these non-NOR patterns will have some broad regions. For example, it may be sufficient to achieve a pattern, which has no nulls in the intended region of coverage, minimizes the energy variation from antenna element to antenna element, and the overall energy transmitted. For such an application, the same approach may be used, with different components in the cost function. Thus, while the specific embodiment will be described in terms of achieving an omnidirectional pattern, other patterns also may be achieved with different variations of the invention.

Experimental Results

The method described above was used to design an azimuthally NOR weight vector w for an array composed of eight 120° patch antenna elements arranged as a linear array with 0.5 1λ spacing operating at 1945.2 MHz. The actual design was done assuming 0.5λ spacing and J(w) as in Eq. 6 with $$a(\theta) = \begin{bmatrix} 1 & e^{-j\pi\cos(\theta)} & \ldots & e^{-j(m-1)\pi\cos(\theta)} \end{bmatrix}^T / \sqrt{8},$$

$$\alpha_1=1.0,\ \alpha_2=1.0,\ \alpha_3=0.5,\ g_d=1.0,$$

and $$\Theta'=[30°,150°].$$

The particular choice for Θ' was made because this example was for a sectored design. gd is selected based on the scaling of a(θ) and the number of elements (8) in the antenna array.

Note that for a linear array, the design problem for a non-sectorized NOR pattern would be from 0 to 180 degrees because of the symmetry. Non-linear and non-symmetric array patterns would require designing over the whole 360° range.

Figure 2:
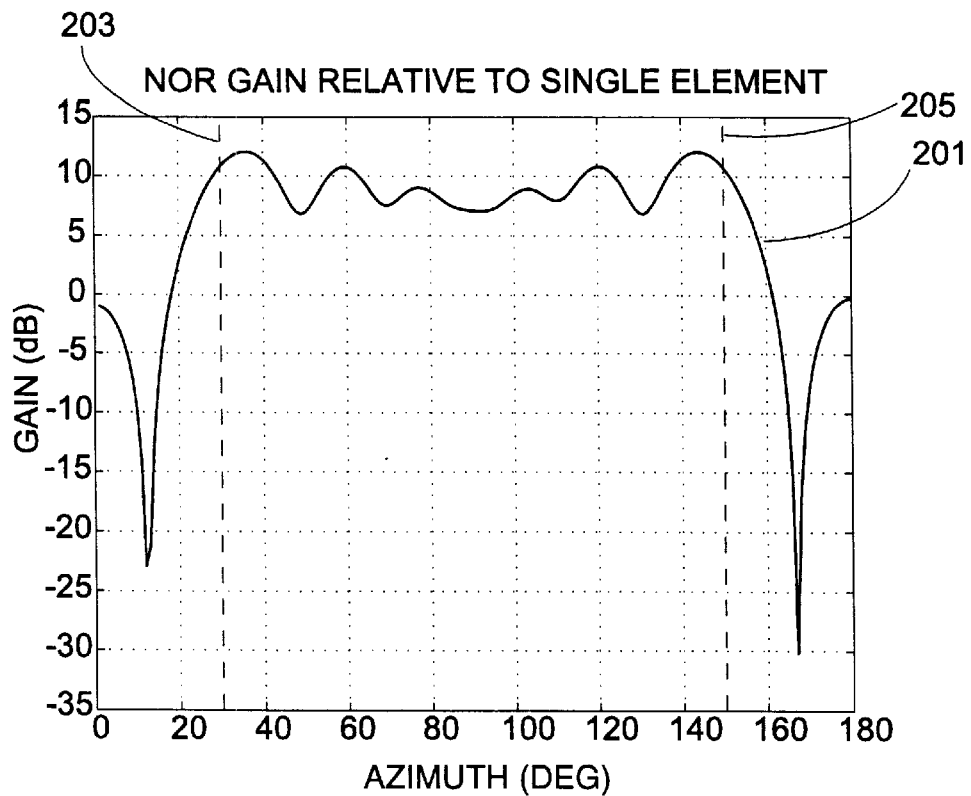
FIG. 2 shows a plot of the calculated (theoretical) gain as a function of azimuth of using the weight vector designed for NOR according to one embodiment of the present invention over using a single antenna element radiating with a power of 1.

As mentioned hereinabove, MATLAB was used to design the weight vector w according to Eq. 7. The results are shown scaled so that the maximum normalized radiated power from any element is 1. The two vertical dotted lines 203 and 205 in FIG. 2 are the limits of the sector [30°,150°]. It is clear that this pattern 201 has significant gain with respect to a single element. Two comments should be made regarding the ripple in the sector [30°,150°]. First, peak-to-peak ripple on the order of a few dB is not likely to be operationally significant. Second, the increased gain at the sector edges is actually a desirable feature of the pattern as it will compensate for the reduced gain in the pattern of the individual elements at the sector edges (cf. Eq. 2). If ripple was not tolerable, a different cost function may be constructed that gives high weighting to the ripple in any particular region. Such modifications would be clear to one of ordinary skill in the art.

Figure 3:
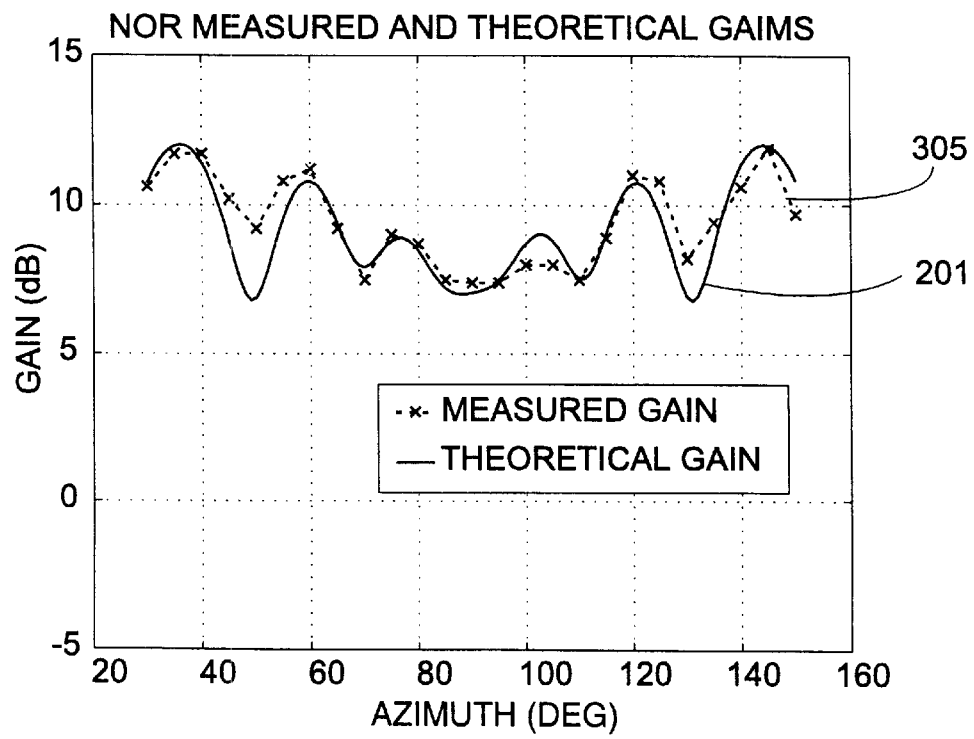
FIG. 3 compares the experimental results using the weight vector designed for NOR according to one embodiment of the present invention with the theoretical results of FIG. 2.

This processing strategy was implemented on the preferred embodiment experimental GSM system with SDMA, and field measurements were taken every 5° within the sector to compare actual performance with theoretical predictions. The results are displayed "x"s on FIG. 3, with these interpolated to give dotted line 305 in FIG. 3. The solid trace 201 in FIG. 3 is the same as in FIG. 2, and as can be seen, there is excellent agreement of the actual field measurements with the theoretical calculations.

Multiple Logical Channels Per Unit Time

There are situations in which it may be desirable to use the antenna array at the BS to simultaneously transmit multiple logical channels on the same carrier under the constraint of a NOR energy pattern. For instance, the antenna array may be used to support multiple downlink traffic channels or several spatial channels on a carrier, the carrier having the additional requirement of an omnidirectional energy pattern. This requirement for example exists for some carriers, including the BCCH carrier in the GSM system. Another aspect of the present invention is a method and apparatus for achieving this. Without using this aspect of the present invention, when transmitting to more than one user in a single timeslot (in an FDMA/TDMA system) or in a conventional channel (in general), normal spatial processing would generate highly directional RF patterns to each of the users, so that the net RF pattern would be directional. It is desirable to be able to transmit the information directionally to such co-channel users (thus not causing interference between the co-channel users), while maintaining a net RF pattern which is near omnidirectional.

Suppose that there is a number, say D MSs (i.e., remote users) at distinct locations given by the D azimuths $\theta_i$, i=1, . . . , D. These locations typically would be at least approximately known. The goal is to design D weight vectors, each causing a directional pattern to a corresponding MS without causing interference with the other MSs, while maintaining a net NOR pattern in the whole region in which a NOR pattern is desired or required. To do this, one first splits the overall parameter space $\Theta$ (where a NOR pattern is desired) into D non-overlapping regions, $\Omega_i$, i=1, . . . , D satisfying $$\theta_i \in \Omega_i, i=1, \ldots, D, \qquad \text{Eq. 8}$$

$$\bigcup_i \Omega_i = \Theta, \text{ and} \qquad \text{Eq. 9}$$

$$\Omega_i \cap \Omega_j = \emptyset, i \neq j. \qquad \text{Eq. 10}$$

Eq. 8 states that the ith MS is in the ith region denoted $\Omega i$, Eq. 9 states that $\Theta$ is the sum of all the D regions, and Eq. 10 states that the regions are non overlapping ($\emptyset$ is the null set). This implies that there is a region for each remote user. One also may have more regions than users, i.e., more than D regions. In such a case, one or more "dummy signals" may be sent to regions where it is known that no user exists. Modifying to include a dummy signal is straightforward. In this description and in the claims, "a dummy signal" shall either to one dummy signal or to several different dummy signals, and which case would be clear to one of ordinary skill in the art from the context. The preferred embodiment, however, uses only D regions. As before, the method of determining the weight vectors for each of the users is includes defining cost functions of D weight vectors $w_1, \ldots, w_D$, each cost function indicating deviations from the desired response pattern, and then solving the minimization problem of finding the set of D weight vectors which minimizes the cost function. Again, many cost functions are possible for this aspect of the invention, and many methods of solving the minimization problem also are possible. In the preferred embodiment, we use the overall cost function determined as follows. Define $$K_i(w_i) = \alpha_{i,1} |||w_i| - |\overline{w_i}|[1 \ldots 1]||_2 + \alpha_{i,2}||w_i||_2 + \qquad \text{Eq. 11}$$

$$\alpha_{i,3} \left\{ \int_{\Omega_i} [|w_i^* a(\theta)| - g_d]^2 \, d\theta \right\}^{\frac{1}{2}}$$

and $$L_i(w_i) = \beta_i \sum_{j \neq i} \left\{ \int_{\Omega_j} |w_j^* a(\theta)|^2 \, d\theta \right\}^{\frac{1}{2}}. \qquad \text{Eq. 12}$$

The overall preferred cost function J(W) is given by $$J(W) = \sum_{i=1}^{D} (K_i(w_i) + L_i(w_i)), \qquad \text{Eq. 13}$$

where W is the set of D weight vectors, $W=\{w_1, \ldots, w_D\}$. The optimal set of weight vectors, denoted by $W_{opt}$, is then given by that set W which minimizes the cost function J(w). In Eq. 11, the meanings of the individual terms are analogous to those in Eq. 7. The $L_i(w_i)$ of Eq. 12 are measures of the energy received by the $i^{th}$ user, but not intended for that user. That is, the energy received in all unintended regions for that weight vector $w_i$. $\beta_i$ is a positive weighting for this component of the overall cost function.

In an alternate embodiment, the following form for $L_i(w_i)$, denoted $L'_i(w_i)$ is used:

$$L'_i(w_i) = \begin{cases} L_i(w_i), & L_i(w_i) > \gamma_i \\ 0 & L_i(w_i) \leq \gamma_i \end{cases} \qquad \text{Eq. 15}$$

where the $\gamma_i$ are D parameters which can be used to set an acceptable level of interference to the user in $\Omega_i$ from the signals intended for the users in $\Omega_j$, j i. Other alternatives also are possible, as would be clear to one of ordinary skill in the art.

As for the single user case, a numerical method preferably is used to solve for the set of weight vectors that minimize J(W). In particular, again, a quasi-Newton method was used, in particular, the quasi-Newton method in the MATLAB Optimization Toolbox, and the real and imaginary components of the $w_i$ were treated as a collection of 2m×D real parameters.

Alternate computationally efficient method

As users move about in the coverage area, the optimal set of weight vectors, W, in general will need to be re-computed. This potentially involves repeatedly solving a computationally intense optimization problem at a high rate. In a first alternate embodiment, a set of situations (location ranges for co-channel users) may be pre-defined, and the weight vectors for such situations pre-computed then pre-stored in a memory. Whenever the known or approximately known locations of the co-channel users fit one of the pre-computed situations, the set of weight vectors for the particular one of the situations is recalled from the memory and used for transmission. In order to ensure that the designed regions for co-channel users are adequately separated, typically more than one set of regions would need to be designed for any particular number of co-channel users. Otherwise, when two users are close to transition zones, co-channel interference may occur.

For approximately uniform antenna array geometries, for example for an approximately uniform linear array, and for some other geometries, a second alternate embodiment includes storing only a very small number of pre-computed sets of weight vectors, and rapidly computing the weight vectors for non-pre-computed situations using a simple calculation. That is, the method involves pre-calculating a prototype set of weights W and then "shifting" that prototype set W to adapt to the mobile users' changing locations in the set $\Theta$.

This second alternate embodiment is best explained using an example. Consider a uniform linear antenna array comprised of m omnidirectional elements with $\lambda/2$ spacing, and suppose further that the overall range for omnidirectional transmission is the whole plane in azimuth, that is, $\Theta=[0°, 180°)$ and the design problem is over azimuth only, without any particular elevation set or polarization set specified. The steering vector $a(\theta)$ for this case is of the form given by Eq. 1, in particular, $$a(\theta)=[1 e^{-j\pi \cos(\theta)} \ldots e^{-j(m-1)\pi \cos(\theta)}]^T. \quad \text{Eq. 16}$$

When using a transmit weight vector, w, the total radiated power as a function of azimuth is proportional to the quantity $P(\theta)$ where $$P(\theta) = |w^* a(\theta)|^2, \theta \in \Theta. \quad \text{Eq. 17}$$

Any vector of the form given by Eq. 16 for $a(\theta)$ is said to have a Vandermonde structure. Suppose $w_r$ is another transmit weight vector which is weight vector w shifted 37°. That is, $$w_r = w \odot [1 e^{-j\pi (\cos(127°) - \cos(90°))} \ldots e^{-j(m-1)\pi (\cos(127°) - \cos(90°))}] \quad \text{Eq. 18}$$

where $\odot$ is the operator indicating element by element multiplication. Because of the Vandermonde structure of $a(\theta)$, the radiated power as a function of azimuth using the weights $w_r$ will be rotated (mod 180°) by a similar amount. In other words, the total radiated power will be proportional to $$|w_r^* a(\theta)|^2 \approx P((\theta+37°) \bmod 180°). \quad \text{Eq. 19}$$

Eq. 19 has approximate equality rather than exact equality because the cosine in Eq. 16. The cosine is nonlinear.

Figure 4A:
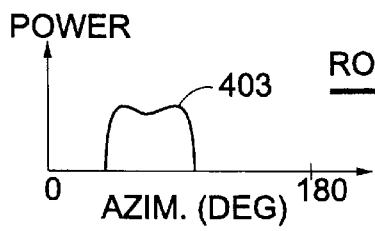
FIG. 4(a) shows the power as a function of angle using a weight vector w for NOR transmission and FIG. 4(b) shows the power as a function of azimuth for the "rotated" weight vector $w_r$ derived from weight vector w.
Figure 4B:
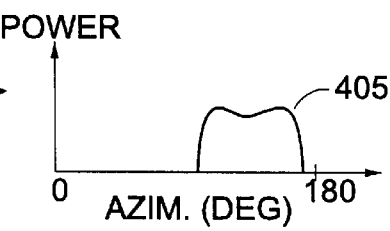

This relationship is depicted in FIGS. 4(a) and 4(b). Plot 403 in FIG. 4(a) shows the power as a function of angle using the original weight vector w, and plot 405 in FIG. 4(b) shows the power as a function of azimuth for the "rotated" weight vector $w_r$.

This concept forms the basis for the second alternate embodiment of the method for simultaneously transmitting multiple, spatially distinct, logical channels while maintaining a NOR radiation pattern. The preferred embodiment of the method proceeds as follows:

1. Partition the parameter space into a finite number of regions whose union is the entire space and the number of regions is the number of co-channel users. Note that other embodiments may have less users than regions.
2. Design weight vectors for each region, the each weight vector providing nearly constant gain over its intended region while minimizing power transmitted into the other regions. This preferably is done by determining the set of weight vectors that minimizes a cost function, the cost function determined by Eq. 13. Pre-store the weight vectors for achieving NOR in the regions as a prototype set of weight vectors.
3. Based on knowledge of the location of the co-channel users, determine the necessary translations of the regions to ensure that co-channel users are adequately separated and that no more than one user is contained in each region. Note that there may be some deformation during translation of the regions. The location or approximate location of users is known in SDMA processing (see for example our Smart Antenna Patents)
4. "Shift" the pre-designed (and pre-stored) weights so that they correspond to the translation of the regions.

The advantage of the second embodiment is that fewer prototype sets of weights need to be pre-stored. In general, pre-calculating only one prototype set for each potential number of co-channel users may be sufficient.

Experimental Results

The second alternate embodiment method described above was used to design two weight vectors, $w_1$ and $w_2$ for a two simultaneous spatial channel system with a composite NOR pattern for a BS with the same antenna array that was used for the single user experiment, i.e., the antenna array includes eight 120° patch antenna elements arranged in a linear array with $0.51\lambda$ spacing at 1945.2 MHz (for a PCS-1900 GSM system). These weights were designed for use with two simultaneous co-channel users with different logical channels (e.g., two different voice conversations on two TCHs), while maintaining an overall net NOR radiation pattern.

The overall range for omnidirectional coverage, $\Theta$, was taken to be the complete plane. That is, $\Theta=[0°,180°)$ (even though the actual area that needed to be covered was [30°,150°] and this range was partitioned into two regions, the first, $\Omega_1$, from 0 to 60 degrees, and from 60 degrees to 180 degrees ($\Omega_1=[0°,60°]\cup[120°,180°)$) and the second, $\Omega_2$, from 60 degrees to 120 degrees ($\Omega_2=(60°,120°)$ with $\Theta=\Omega_1\cap\Omega_2$.

It should be notes that the sectorization to a 120° sector is effected by the physical radiation patterns of the individual antenna elements (cf. Eq. 2), so that the sectoring in the radiation pattern would exist even though $\Theta=[0°,180°)$ was chosen. The decision to have the designed for region $\Theta$ extend over 180° was because of the periodic wrapping of patterns for a linear antenna array of the preferred embodiment. Shifting a pattern to less than 0° shifts the pattern "going negative" downwards from 180°. This is called "wrapping". The wrapping property is used to make the two prototype patterns for the two-user case by shifting a single pattern. While this property is desirable, it is not a necessary part of this aspect of the invention, which may be practiced in other ways.

The regions' breakpoints were taken as $\{60°,120°\}$ because $\cos(60°)=-\cos(120°)=0.5$. This gave equal angular width regions, one a shift (modulo the wrapping property) of the other. Thus, with this region definition and the wrapping property, only one optimization problem needed to be solved: determining the weight vector $w_1$ corresponding to $\Omega_1$. $w_2$ as then created by shifting $w_1$ by 90°.

Other breakpoints and regions also may be defined. If the shift property does not permit the two prototype regions to be related by a shift, two optimization problems would need to be solved.

While it is preferable to ensure that the whole region $\Theta$ is the union of all the individual regions, it may occur that doing so creates some computational problems, for example, in the quasi-Newton method. In the particular implementation used of the second alternate embodiment, a buffer zone of 10° was incorporated at the edge of each region. This was found to improve convergence properties of the Quasi-Newton optimization routine. Thus $\Omega_1=[0°,50°] \cup [130°, 180°)$ and $\Omega_2=[70°,110°]$. This element of the design implies that a 20° separation will have to be maintained for co-channel users. The actual cost function employed to calculate $w_1$ was as that of Eq. 13, using only $K_1$ (i.e., $\alpha_{2,i}=0$) with $$a(\theta)=[1 e^{-j\pi \cos(\theta)} \ldots e^{-j(m-1)\pi \cos(\theta)}]^T; \quad \text{Eq. 20}$$

$$\alpha_{1,1}=6.0;\ \alpha_{1,2}=0.0;\ \alpha_{1,3}=1.0;\ g_d=1; \quad \text{Eq. 21}$$

$$\Omega_1=[0°,50°] \cup [130°, 18°);\ \text{and } \Omega_2=[70°, 110°]. \quad \text{Eq. 22}$$

A modified version of $L_1$ was used which aims to reduce $\Omega_1$ to $\Omega_2$ interference by at least 30 dB while penalizing positive-going extrema of the $\Omega_1$ energy pattern in $\Omega_2$. Mathematically, $$L_1(w_1) = 0.1 \max\left\{0, 30 - 20\log_{10} \frac{\frac{1}{|\Omega_1|}\int_{\Omega_1}|w_1^*a(\theta)|d\theta}{\frac{1}{|\Omega_2|}\int_{\Omega_2}|w_1^*a(\theta)|d\theta}\right\} + \quad \text{Eq. 23}$$

$$0.2\max_{\Omega_2}|w_1^*a(\theta)|.$$

$w_2$ is obtained by rotating $w_1$ to be centered at 90° rather than 0°. Plots of the two patterns are shown as curves 503 and 505 in FIG. 5. To produce the plots, the weights were normalized so that the maximum modulus of the elements in either weight vector was 0.5, so that the normalized power transmitted from any element is no greater than unity. Indicated gains on the plot are relative to a single element transmitting at a normalized power of unity. Note that the radiated power as a function of azimuth, that is, the sum of the to traces 503 and 505 is still greater than that achievable with a single transmitting element operating at comparable power.

These weights $w_1$ and $w_2$ are appropriate for two users if one user is in each of $\Omega_1$ and $\Omega_2$ as defined above. If this is not the case (where remote users may be determined by several techniques. See for example, our Smart Antenna Patents), the patterns are shifted by $[\cos(\theta_1)+\cos(\theta_2)]-\cos(60°)$, and sorted so that $\theta_1>\theta_2$, as described above to shift the breakpoint between the patterns to the midpoint between the users. For user angles of 94° and 137°, the resultant patterns are displayed in FIG. 6 as plots 603 and 605. Note that the weight calculation is based solely on azimuthal distance between users and is very efficient computationally.

Figure 5:
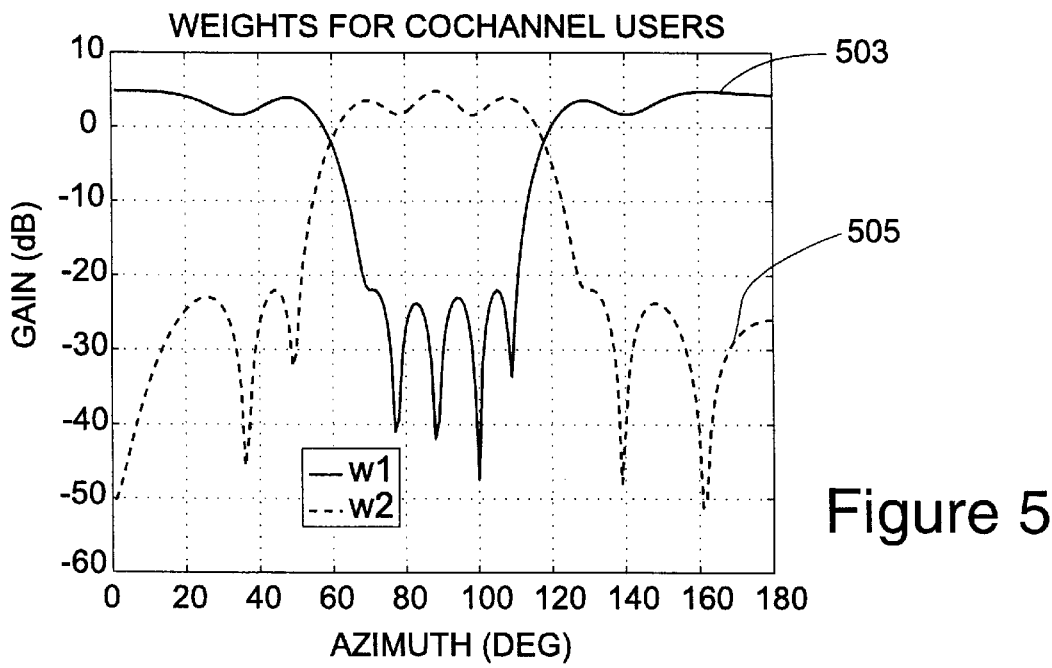
FIG. 5 shows plots of the gain obtained by using two weight vectors for NOR transmission, each to a NOR region, the weight vectors determined according to one embodiment of the present invention.

Below is the MATLAB code used to generate FIGS. 5 and 6. In the MATLAB code, the actual weights determined by the optimization are shown as parameters and need to be input into the code. To generate FIG. 5, one issues the command Pat2 (0, [94 137], 1), and to create FIG. 6, one issued the command Pat2(1, [94 137], 1).

```
%
function pat2(sel, angs, new)
%
% usage: pat2(sel, angs, new)
% inputs: sel - 0, prototype two-user weights for 20 deg. minimum
                   separation.
%             1, two-user weights for specified angle
%         angs - 1x2 vector of user azimuths in degrees, both angles
   in
%             [30,150]
%         new - optional, specified MATLAB figure number
%
%%%%%%%%%%%%%%%%%%%%%%%%%%%%%%%%%%%%%%
   %
% The weight vector elements are shown here as parameters.
% User would modify the code and insert the actual real and
% imaginary parts for each number w__real__i and w__imag__i, I=1, ... ,
% 8. and w__2real__i and w__2imag__i, repectively:
%%%%%%%%%%%%%%%%%%%%%%%%%%%%%%%%%%%%%%
   %
w = [w__real__1 + w__imag__1i
     w__real__2 + w__imag__2i
     w__real__3 + w__imag__3i
     w__real__4 + w__imag__4i
     w__real__5 + w__imag__5i
     w__real__6 + w__imag__6i
     w__real__7 + w__imag__7i
     w__real__8 + w__imag__8i ] ;
patBp = 60;
%
% physical constants
%
doverlam = 0.079/(2.997925e8/1945.2e6);
dtr = pi/180;
tpdol = 2*pi*doverlam;
%
% basic unshifted two-user weights, scaled for max. Tx power of unity
%
wl = w(:)/(2*max(abs(w)));
wh = wl .* ( (-1).^[0:7]');
%
% shift weights corresponding to user locations and calculate
% beampatterns
%
angs = sort(angs);
centerphase = tpdol * sum(cos(angs*dtr))/2;
shift = centerphase - tpdol*cos(patBp*dtr);
if ( sel == 1 )
    wl = wl.*exp(-j*[0:7]'*shift);
    wh = wh.*exp(-j*[0:7]'*shift);
end
patL = (wl.'*exp(j*2*pi*doverlam*[0:7]'*cos([1:180]*pi/180)));
patH = (wh.'*exp(j*2*pi*doverlam*[0:7]'*cos([1:180]*pi/180)));
%
% plot two-user patterns
%
if ( nargin == 3 )
    figure(new)
else
    figure(1)
end
clf
hl1 = plot(20*log10(abs(patL)), 'g');
hold
hl2 = plot(20*log10(abs(patH)), 'r--');
```

```
axis([0 180 -60 10])
if ( sel == 0 )
    h = legend([hl1 hl2], 'w1', 'w2');
else
    h = legend([hl1 hl2], sprintf('User @ %d', fix(angs(1))), ...
        sprintf('User @ %d', fix(angs(2))));
end
xlabel('Azimuth (deg)')
ylabel('Gain (dB)')
title('Weights for Co-Channel Users')
grid
axes(h)
```

Dithering

In a further improvement, the breakpoint between the patterns is dithered by a small amount, preferably 5°, the dithering at some low frequency, for example a frequency of several hundred Hertz. As a result, no location in the cell is permanently at a local minimum of the composite pattern, and the time-averaged energy as a function of azimuth is relatively constant.

The dithering may be carried out, for example, by having a slightly different shift from burst to burst. If for example, a shift of angle θ is required for some prototype weight, then the shift applied at each burst would be θ+5°×rnd, where rnd is a random number uniformly distributed between ±1. Thus from burst to burst, the weight vector would be dithered in shift from a nominal weight vector.

Figure 6:
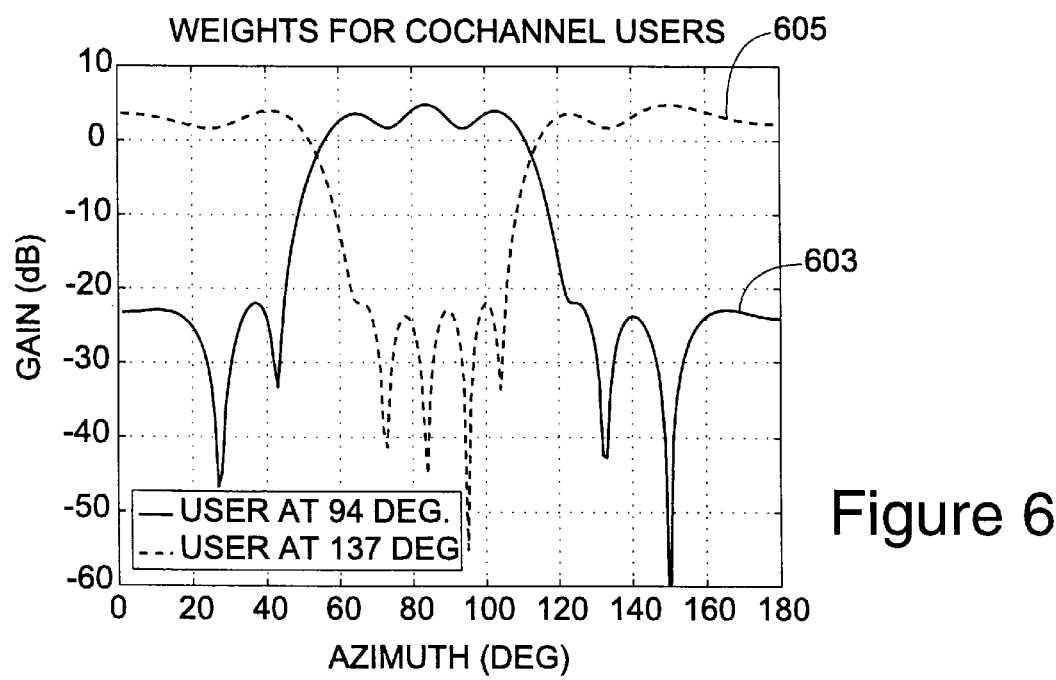
FIG. 6 shows plots of the gain obtained by using two weight vectors for NOR transmission to two simultaneous users on the same conventional channel, the weight vectors determined from the weight vectors determined for the example of FIG. 5, according to an alternate embodiment of the present invention.
Figure 7:
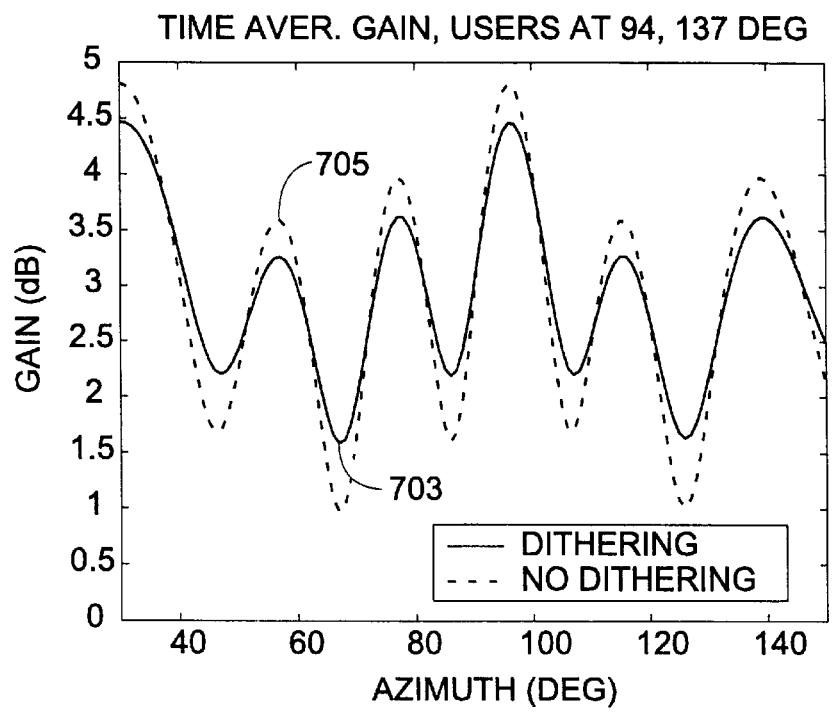
FIG. 7 shows the gain as a function of azimuth with and without dithering, the dithering according to an aspect of the present invention.

FIG. 7 shows the time average power gain over transmitting omnidirectionally on one antenna element obtained with and without dithering for the same two simultaneous user case as illustrated in FIG. 6. The average is over 100 repetitions in which the relative phases of the two signals is made random. Solid curve 703 shows the results with dithering, while dashed curve 705 shows the results with no dithering.

Below is the MATLAB code "ditherDemo" used to generate FIG. 7. As in the code Pat2, the actual weights determined by the optimization are shown as parameters and need to be input into the code.

```
%
function ditherDemo
%
% usage: ditherDemo
%
% plot time-averaged net-energy patterns for users at angles
        "userAngs"
% for a 0.079 m spaced uniform linear array at frequency 1945.2 MHz in
% dithered and non-dithered cases.
%
% Operation: Modify code by adding weights.
%
%%%%%%%%%%%%%%%%%%%%%%%%%%%%%%%%%%%%%%%%%
%%
userAngs = [94 137];
%
% physical and simulation constants
%
doverlam = 0.079/(2.997925e8/1945.2e6);
dtr = pi/180;
tpdol = 2*pi*doverlam;
calcAngs = [30:150];
innerIter = 100;
a = exp(-j*tpdol*[0:7]'*cos(calcAngs*dtr));
%
%%%%%%%%%%%%%%%%%%%%%%%%%%%%%%%%%%%%
%
% The 20 degree separation weight vector elements are shown here
% as parameters.
% User would modify the code and insert the actual real and
% imaginary parts for each number w_real_i and w_imag_i, I=1,Ö 8.
% and w_2real_i and w_2imag_i, repectively:
%%%%%%%%%%%%%%%%%%%%%%%%%%%%%%%%%%%%%%%%%
%
w = [ w_real_1 [30 w_imag_1i
      w_real_2 [30 w_imag_3i
      w_real_3 [30 w_imag_3i
      w_real_4 [30 w_imag_4i
      w_real_5 [30 w_imag_5i
      w_real_6 [30 w_imag_6i
      w_real_7 [30 w_imag_7i
      w_real_8 [30 w_imag_8i ] ;
patBp = 60;
%%%%%%%%%%%%%%%%%%%%%%%%%%%%%%%%%%%%%
%
% choose innerIter different dither angles and for each of
% these we choose 100 different relative phases of the signals.
% Compute mean power versus azimuth over all experiments
%%%%%%%%%%%%%%%%%%%%%%%%%%%%%%%%%%%%%
%
innerArray = zeros(size(a,2),innerIter);
for inner = 1:innerIter
    wl = w(:)/(2*max(abs(w)));
    wh = wl .* ((-1).^[0:7]')
    %
    % this if-block is the dithering step
    %
    angs = sort(userAngs);
    if ( abs(diff(angs)) >= 25
        angs = angs + (10*(rand(1,1)-.5));
    end
    centerPhase = tpdol * sum(cos(angs*dtr))/2;
    shift = centerPhase - tpdol*cos(patBp*dtr);
    wl = wl.*exp(-j*[0:7]'*shift);
    wh = wh.*exp(-j*[0:7]'*shift);
    power = (abs((wl*ones(1,100)+wh*exp(j*2*pi*rand(1,100))).' * a)).^2;
    innerArray(:,inner) = mean(power)';
end
powArrayAO = mean(innerArray')';
%
% Compute mean power versus azimuth for non-dithered case
%
wl = w(:)/(2*max(abs(w)));
wh = wl .* ((-1).^[0:7]');
angs = sort(userAngs),
centerPhase = tpdol * sum(cos(angs*dtr))/2;
shift = centerPhase - tpdol*cos(patBp*dtr);
wl = wl.*exp(-j*[0:7]'*shift);
wh = wh.*exp(-j*[0:7]'*shift);
power = (abs((wl*ones(1,1000)+wh*exp(j*2*pi*rand(1,1000))).' * a)).^2;
powArray = mean(power);
%
% plot results
%
figure (1)
hold off
clf
hl1 = plot(calcAngs,10*log10(powArrayAO),'g');
hold on
hl2 = plot(calcAngs,10*log10(powArray),'r-.');
ax=axis;
axis([min(calcAngs) max(calcAngs) 0 ax(4)])
title(sprintf('Time Averaged Gain for Users at %d, %d Degrees',
    userAngs));
xlabel('Azimuth (deg)')
ylabel('Gain (dB)')
h = legend([hl1 hl2],'dithering', 'no dithering');
```

Dithering for One User per Spatial Channel

The dithering described above for the several user case may also be used to reduce the ripple for the one user per conventional user case. The weight vector is similarly shifted up or down by several degrees, at some low frequency, preferably from burst to burst.

Field Tests

Figure 8:
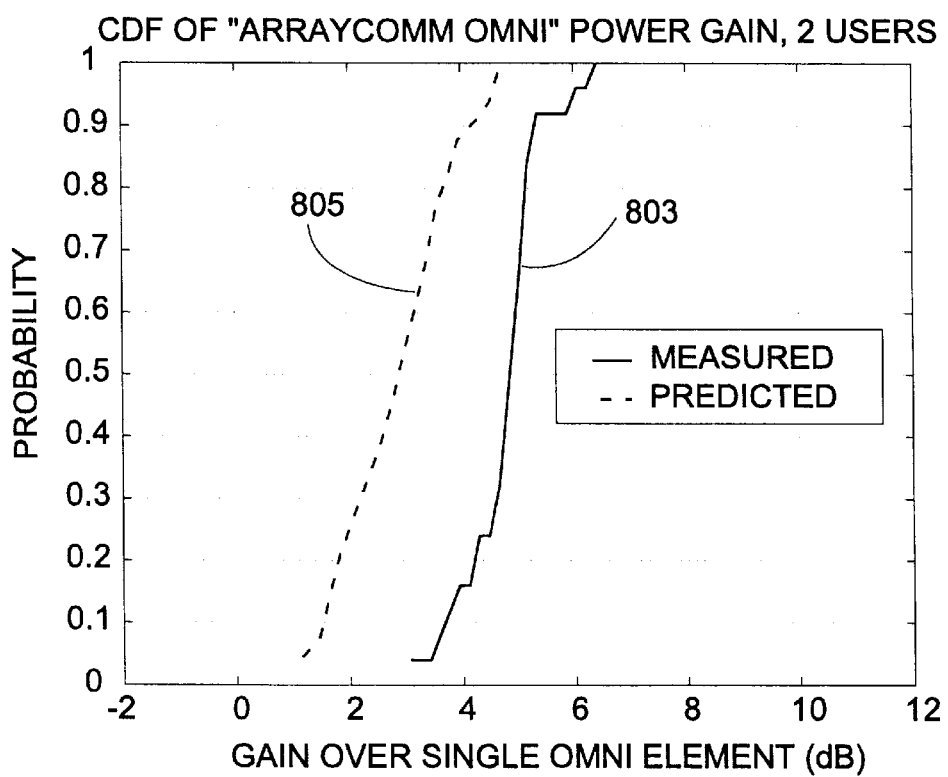
FIG. 8 shows the measured and theoretical cumulative distribution function of the downlink power gain in an experiment using one embodiment of the present invention, the gain relative to radiation from a single element at a normalized power of unity.

Field tests for the design also were carried out. FIG. 8 displays the field trial results. Three experiments were conducted on the experimental GSM system operating at PCS-1900 frequencies. In each experiment, a pair of co-channel users was set up at fixed azimuths, and received power measurements were alternately made with a single radiating element and with the method and apparatus of the second alternate embodiment of the present invention (with dithering). Measurements were taken at 5° increments within the sector. The azimuth pairs of the users for the three experiments were 52°/107°, 52°/84° and 60°/136°, respectively. The gain of using the second embodiment over using a single radiating element calculated at each angle, and then a cumulative distribution function of these gains determined. The solid trace 803 in the figure is this measured cumulative distribution function of the downlink power gain of the scheme used (relative to radiation from a single element at a normalized power of unity). This trace 803 is a composite result for the data collected during all three experiments. The dashed 805 curve is a theoretical prediction including the effects of the breakpoint dithering strategy. The theoretical results were obtained carrying out a monte-carlo simulation of the above described experiment. The shapes of the two curves appear to be in excellent agreement. The 1.5 to 2 dB offset between the curves likely is attributable to a systematic measurement error between the collections made for the single antenna and multiple antenna data.

As will be understood by those skilled in the art, the skilled practitioner without departing from the spirit and scope of the invention may make many changes in the methods and apparatuses described above. For example, the system may be implemented for different communications protocols, different methods for determining the weights w that achieve desirable patterns, including NOR patterns may be used, etc. The scope of the invention should be limited only as set forth in the claims that follow.

What is claimed is:

1. A method for transmitting a downlink signal from a communication station to one or more subscriber units, the communication station including an array of antenna elements, each antenna element coupled to an associated transmit apparatus, the associated transmit apparatuses coupled to one or more signal processors for weighting the downlink signals in phase and amplitude according to a weight vector, the method comprising:

(a) determining a first weight vector designed for transmitting with low relative radiated power to achieve a desired radiation pattern over a desired sector without requiring pre-orthogonalizing the downlink signal;

(b) weighting the downlink signal with the selected first weight vector using the one or more signal processors to form a set of weighted downlink antenna signals, each weighted downlink antenna signal having an intended antenna element in the array; and (c) transmitting the downlink signal by passing each weighted downlink antenna signal of the set of weighted downlink antenna signals to its intended antenna element through the intended antenna element's associated transmit apparatus.

2. The method according to claim 1, further including (d) receiving the downlink signal in at least one subscriber unit.

3. The method according to claim 1 wherein the desired sector includes a range of azimuths.

4. The method according to claim 3 wherein the desired sector includes a range of elevations.

5. The method according to claim 1 wherein the desired radiation pattern is a NOR pattern.

6. The method according to claim 1 wherein the weight vector determined in said step (a) is that weight vector that minimizes a cost function of the weight vector, the cost function including a first expression of variation of the radiation pattern resulting from transmitting using the weight vector from the desired radiation pattern over the desired sector.

7. The method according to claim 6 wherein the cost function includes an expression of the total power transmitted from the antenna elements by using the weight vector.

8. The method according to claim 6 wherein the cost function includes an expression of variations in transmitted power among the antenna elements when using the weight vector.

9. The method of claim 5 wherein said step (a) of determining further includes (i) specifying a cost function of the weight vector, the cost function including an expression of variation of the radiation pattern resulting from transmitting using the weight vector from a NOR pattern over the desired sector; and (ii) selecting as the first weight vector that weight vector that minimizes the cost function.

10. The method according to claim 9 wherein the cost function includes an expression of the total power transmitted from the antenna elements by using the weight vector.

11. The method according to claim 10 wherein the cost function includes an expression of the variations in transmitted power among the antenna elements by using the weight vector.

12. The method according to claim 1 wherein the communication station is part of a FDMA/TDMA system.

13. The method according to claim 12 wherein the communication station operates according to a variant of the GSM communications protocol.

14. The method according to claim 12 wherein the communication station operates according to a variant of the PHS communications protocol.

15. The method according to claim 1 wherein the communication station is part of a CDMA system.

16. A method for transmitting a plurality of downlink signals from a communication station to a corresponding plurality of subscriber units over a conventional channel, each downlink signal having an intended subscriber unit, each intended subscriber unit having a location, each location being at least approximately known, the communication station including an array of antenna elements, each antenna element coupled to an associated transmit apparatus, the associated transmit apparatuses coupled to one or more signal processors for spatial multiplexing the downlink signals, the spatial multiplexing including weighting each downlink signal in phase and amplitude according to a weight vector and adding the weighted signals, the method comprising:

(a) determining a plurality of desirable weight vectors, each subscriber unit having an associated desirable weight vector in the plurality of desirable weight vectors, each associated desirable weight vector designed for downlink communication to its associated subscriber unit, the plurality of desirable weight vectors designed for producing an overall desirable radiation pattern over a desired sector;

(b) spatial multiplexing the plurality of downlink signals, the multiplexing including weighting each particular downlink signal with the desirable weight vector associated with the particular downlink signal's intended subscriber unit, the spatial multiplexing by desirable weight vectors that are not associated desirable weight vectors in the plurality of desirable weight vectors being of one or more dummy signals, the spatial multiplexing using the one or more signal processors to form a set of summed and weighted downlink antenna signals, each summed and weighted downlink antenna signal having an intended antenna element in the array; and (c) transmitting the plurality of downlink signals by passing each summed and weighted downlink antenna signal to its intended antenna element, the passing through the intended antenna element's associated transmit apparatus.

17. The method according to claim 16 wherein the number of weight vectors in the plurality of desirable weight vectors is the same as the number of subscriber units so that all desirable weight vectors in the set of desirable weight vectors are associated desirable weight vectors.

18. The method according to claim 16, further including (d) receiving the spatially multiplexed plurality of downlink signals at a particular one of the subscriber units.

19. The method according to claim 17 wherein the overall desirable radiation pattern is a NOR pattern.

20. The method according to claim 17 wherein the desired sector includes a range of azimuths.

21. The method according to claim 20 wherein the desired sector includes a range of elevations.

22. The method according to claim 16 wherein the desired sector includes a set of corresponding regions, each corresponding region including at most one subscriber unit's location, the union of all the corresponding regions substantially covering the desired sector, in said determining step (a), each desirable weight vector is determined for transmission to one of the corresponding regions, and the plurality of desirable weight vectors determined in said determining step (a) is the plurality of weight vectors that minimizes a cost function of possible weight vectors, the cost function including an expression of the variation from the desirable radiation pattern of the net overall radiation pattern resulting from transmitting using the plurality of weight vectors.

23. The method according to claim 22 wherein the number of weight vectors in the plurality of desirable weight vectors is the same as the number of subscriber units so that all desirable weight vectors in the set of desirable weight vectors are associated desirable weight vectors, and each subscriber unit's location is in one of the corresponding regions.

24. The method according to claim 23 wherein the cost function includes an expression of the total power transmitted from the antenna elements using each weight vector.

25. The method according to claim 23 wherein the cost function includes an expression of the variations in transmitted power among the antenna elements using each weight vector.

26. The method according to claim 23 wherein the cost function includes an expression of the energy received in unintended corresponding regions for each weight vector.

27. A method for transmitting a plurality of downlink signals from a communication station to a corresponding plurality of subscriber units over a conventional channel with an overall desirable radiation pattern over a desired sector, each downlink signal having an intended subscriber unit, each intended subscriber unit having a location, each location being at least approximately known, the communication station including an array of antenna elements, each antenna element coupled to an associated transmit apparatus, the associated transmit apparatuses coupled to one or more signal processors for spatial multiplexing the downlink signals, the spatial multiplexing including weighting each downlink signal in phase and amplitude according to a weight vector and adding the weighted signals, the method comprising:

(a) partitioning the desired sector into a set of regions, the number of regions the same as the number of subscriber units, the union of all the regions substantially covering the desired sector;

(b) determining a plurality of desirable weight vectors, each desirable weight vector designed for downlink communication to one of the regions, the plurality of desirable weight vectors designed for producing the overall desirable radiation pattern over the desired sector, the plurality of desirable weight vectors and the set of regions defining a situation;

(c) storing the desirable weight vectors in a memory;

(d) repeating the steps (a) through (c) for different sets of regions until a sufficient number of situations is stored;

(e) recalling from the memory the plurality of desirable weight vectors of the situation appropriate f or the locations of the subscriber units;

(f) spatial multiplexing the plurality of downlink signals, the multiplexing including weighting each particular downlink signal with the recalled desirable weight vector designed to transmit to the region that includes the location of the particular downlink signal's intended subscriber unit, the spatial multiplexing using t he one or more signal processors to form a set of summed and weighted downlink antenna signals, each summed and weighted downlink antenna signal having an intended antenna element in the array; and (g) transmitting the plurality of downlink signals by passing each summed and weighted downlink antenna signal to its intended antenna element, the passing through the intended antenna element's associated transmit apparatus.

28. The method according to claim 27 wherein the plurality of desirable weight vectors determined in said step (b) is the plurality of weight vectors that minimizes a cost function of possible weight vectors, the cost function including an expression of the variation from the desirable radiation pattern of the net overall radiation pattern resulting from transmitting using the plurality of weight vectors.

29. The method according to claim 28 wherein the cost function includes an expression of the total power transmitted from the antenna elements using each weight vector.

30. The method according to claim 28 wherein the cost function includes an expression of the variations in transmitted power among the antenna elements using each weight vector.

31. The method according to claim 28 wherein the cost function includes an expression of the energy received in unintended corresponding regions for each weight vector.

32. A method for transmitting a plurality of downlink signals from a communication station to a corresponding plurality of subscriber units over a conventional channel with an overall desirable radiation pattern over a desired sector, each downlink signal having an intended subscriber unit, each intended subscriber unit having a location, each location being at least approximately known, the communication station including an array of antenna elements, the antenna elements approximately uniformly distributed, each antenna element coupled to an associated transmit apparatus, the associated transmit apparatuses coupled to one or more signal processors for spatial multiplexing the downlink signals, the spatial multiplexing including weighting each downlink signal in phase and amplitude according to a weight vector and adding the weighted signals, the method comprising:

(a) partitioning the desired sector into a set of regions, the number of regions being at least the number of subscriber units, the union of all the regions substantially covering the desired sector;

(b) determining a plurality of desirable weight vectors, each desirable weight vector designed for downlink communication to one of the regions, the plurality of desirable weight vectors designed for producing the overall desirable radiation pattern over the desired sector, the plurality of desirable weight vectors and the set of regions defining a situation;

(c) determining a translation of the set of regions using the locations of the subscriber units to ensure that there is no more than one subscriber unit per translated region and that the locations of the subscriber units are adequately separated;

(d) shifting each determined desirable weight vector to form a plurality of shifted weight vectors, each shift corresponding to the translation determined in the step (c);

(e) spatial multiplexing the plurality of downlink signals, the multiplexing including weighting each particular downlink signal with the shifted weight vector designed to transmit to the translated region that includes the location of the particular downlink signal's intended subscriber unit, the spatial multiplexing by any shifted weight vectors that are designed to transmit to any translated regions that have no subscriber unit being of one or more dummy signals, the spatial multiplexing using the one or more signal processors to form a set of summed and weighted downlink antenna signals, each summed and weighted downlink antenna signal having an intended antenna element in the array; and (f) transmitting the plurality of downlink signals by passing each summed and weighted downlink antenna signal to its intended antenna element, the passing through the intended antenna element's associated transmit apparatus.

33. The method according to claim 32 wherein each shifted region has a subscriber unit, and wherein the plurality of desirable weight vectors determined in said step (b) is the plurality of weight vectors that minimizes a cost function of possible weight vectors, the cost function including an expression of the variation from the desirable radiation pattern of the net overall radiation pattern resulting from transmitting using the plurality of weight vectors.

34. The method according to claim 33 wherein the cost function includes an expression of the total power transmitted from the antenna elements using each weight vector.

35. The method according to claim 33 wherein the cost function includes an expression of the variations in transmitted power among the antenna elements using each weight vector.

36. The method according to claim 33 wherein the cost function includes an expression of the energy received in unintended corresponding regions for each weight vector.

37. The method according to claim 33 wherein the steps (d) through (f) are periodically repeated, the shift in each repetition dithered around the translation determined in the step (c).

38. The method according to claim 37 wherein the dithering includes adding a randomized shift to the translation determined in the step (c).

39. The method according to claim 1 wherein the antenna elements are approximately uniformly distributed, and wherein the steps (b) through (c) are periodically repeated using a plurality of shifted weight vectors in place of a plurality of desirable weight vectors, each shifted weight vector formed by shifting each desirable weight vector, the shift in each repetition dithered so that the average shift is zero.

40. A communication station for transmitting a downlink signal to one or more subscriber units, the communication station including (a) an array of antenna elements;

(b) means for determining a first weight vector designed for transmitting through the array with low relative radiated power to achieve a desired radiation pattern over a desired sector without requiring pre-orthogonalizing the downlink signal;

(c) one or more signal processors coupled for weighting the downlink signal in phase and amplitude according to the determined first weight vector to form a set of weighted downlink antenna signals, each weighted downlink antenna signal having an intended antenna element in the array; and (d) a set of associated transmit apparatuses for transmitting the set of weighted downlink antenna signals through the array, each antenna element coupled to the output of an associated transmit apparatus in the set of associated transmit apparatuses, each associated transmit apparatus including an input for receiving one of the weighted downlink antenna signals.

41. The communication station according to claim 40 wherein the desired sector includes a range of azimuths.

42. The communication station according to claim 41 wherein the desired sector includes a range of elevations.

43. The communication station according to claim 40 wherein the desired radiation pattern is a NOR pattern.

44. The communication station according to claim 40 wherein the means for determining selects as the first weight vector that weight vector that minimizes a cost function of the weight vector, the cost function including a first expression of variation of the radiation pattern resulting from transmitting using the weight vector from the desired radiation pattern over the desired sector.

45. The communication station according to claim 44 wherein the cost function includes an expression of the total power transmitted from the antenna elements by using the weight vector.

46. The communication station according to claim 44 wherein the cost function includes an expression of the variations in transmitted power among the antenna elements when using the weight vector.

47. A communication station for transmitting one or more of downlink signals to a one or more subscriber units over a conventional channel, each downlink signal having one or more intended subscriber units, each intended subscriber unit having a location, each location being at least approximately known, the communication station comprising:

(a) an array of antenna elements;

(b) means for determining a plurality of desirable weight vectors, each subscriber unit having an associated desirable weight vector in the plurality of desirable weight vectors, each associated desirable weight vector designed for downlink communication to its associated subscriber unit, the plurality of desirable weight vectors designed for producing an overall desirable radiation pattern over a desired sector;

(c) one or more signal processors for spatial multiplexing a plurality of downlink signals to form a set of summed and weighted downlink antenna signals, the multiplexing including weighting each particular downlink signal with the desirable weight vector associated with the particular downlink signal's intended subscriber unit, the spatial multiplexing by desirable weight vectors that are not associated desirable weight vectors in the plurality of desirable weight vectors being of one or more dummy signals; and (d) a set of associated transmit apparatuses for transmitting the set of summed and weighted downlink antenna signals through the array, each antenna element coupled to the output of an associated transmit apparatus in the set of associated transmit apparatuses, each associated transmit apparatus including an input for receiving one of the weighted downlink antenna signals.

48. The communication station according to claim 47 wherein the number of weight vectors in the set of desirable weight vectors is the same as the number of subscriber units so that all desirable weight vectors in the set of desirable weight vectors are associated desirable weight vectors.

49. The communication station according to claim 48 wherein the desired sector includes a set of corresponding regions, each corresponding region including at most one subscriber unit's location, the union of all the corresponding regions substantially covering the desired sector, each desirable weight vector is determined for transmission to a corresponding region by the determining means (b), and the plurality of desirable weight vectors determined by the determining means (b) is the plurality of weight vectors that minimizes a cost function of possible weight vectors, the cost function including an expression of the variation from the desirable radiation pattern of the net overall radiation pattern resulting from transmitting using the plurality of weight vectors.

\* \* \* \* \*